(12) United States Patent
Lu

(10) Patent No.: US 12,638,285 B2
(45) Date of Patent: May 26, 2026

(54) SEMICONDUCTOR MICRO BUMP HEIGHT MEASUREMENT METHOD

(71) Applicant: SAULTECH TECHNOLOGY CO., LTD., Zhubei City (TW)

(72) Inventor: Yen Hao Lu, Zhubei City (TW)

(73) Assignee: SAULTECH TECHNOLOGY CO., LTD., Hsinchu County (TW)

( * ) Notice: Subject to any disclaimer, the term of this patent is extended or adjusted under 35 U.S.C. 154(b) by 106 days.

(21) Appl. No.: 18/916,842

(22) Filed: Oct. 16, 2024

(65) Prior Publication Data

US 2026/0063414 A1     Mar. 5, 2026

(30) Foreign Application Priority Data

Sep. 3, 2024    (TW) ................................. 113133357

(51) Int. Cl.
*G01B 11/06*          (2006.01)
*G06T 7/00*           (2017.01)

(52) U.S. Cl.
CPC ........ *G01B 11/0608* (2013.01); *G06T 7/0006* (2013.01); *G06T 7/001* (2013.01); *G06T 2207/30148* (2013.01)

(58) Field of Classification Search
CPC ... G01B 11/0608; G06T 7/0006; G06T 7/001; G06T 2207/30148
See application file for complete search history.

(56) References Cited

FOREIGN PATENT DOCUMENTS

JP          H08159721 A   *   6/1996
JP          H09329422 A   *  12/1997

* cited by examiner

*Primary Examiner* — Hina F Ayub

(57)          ABSTRACT

A semiconductor micro bump height measurement method includes the following steps: capturing a top image of a reference object by a first image capture unit and a second image capture unit; capturing a top image of a target object by the first image capture unit, and sensing a first movement distance d of a work platform or a first light source and the first image capture unit; capturing a top image of the target object by the second image capture unit, and sensing the second movement distance D of the work platform or a second light source and the second image capture unit; and when d=D, the height of the target object being equal to the height of the reference object; when d>D, calculating the height of the target object as: $\Delta H=(d-D)\times\tan(\theta)\square H=H_s+\Delta H$; when d<D, calculating the height of the target object as: $\Delta H=(D-d)\times\tan(\theta)\square H=H_s\Delta H$.

10 Claims, 33 Drawing Sheets

Placing a reference object and an target object on a work platform, wherein both the reference object and the target object are of a spherical shape, the height of the reference object is $H_S$, the height of the target object is H, both the reference object and the target object are semiconductor micro bumps ⟶ S10

A light of a first light source and a light of a second light source being simultaneously reflected by the top of the reference object, a first image capture unit capturing an image of the top of the reference object through the reflected light of the first light source, and a second image capture unit capturing an image of the top of the reference object through the reflected light of the second light source; a first angle being formed between the light of the first light source and a horizontal plane passing through the top of the reference object, a second angle being formed between the reflected light of the first light source and the horizontal planes passing through the top of the reference object, and the first angle being equal to the second angle ⟶ S20

Moving the work platform or moving the first light source, the second light source, the first image capture unit, and the second image capture unit ⟶ S30

The light of the first light source being reflected by the top of the target object, the first image capture unit capturing an image of the top of the target object by the reflected light of the first light source, and a sensing unit sensing a first movement distance of the work platform or a first movement distance of the first light source and the first image capture unit, and defining the first movement distance as d ⟶ S40

The light of the second light source being reflected by the top of the target object, the second image capture unit capturing an image of the top of the target object by the reflected light of the second light source, and a sensing unit sensing a second movement distance of the work platform or a second movement distance of the second light source and the second image capture unit, and defining the second movement distance as D ⟶ S50

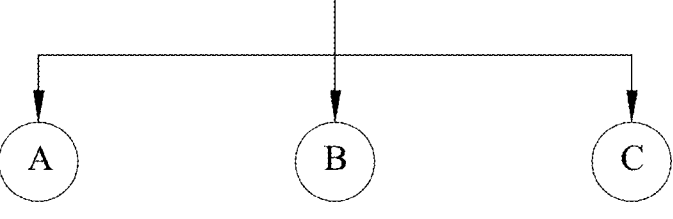

When the first movement distance being equal to the second movement distance, a processing unit determining that a height of the target object being equal to the height of the reference object and the target object as non-defective          ~S61

FIG. 1B

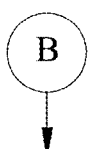

When the first movement distance being greater than the second movement distance, the processing unit determining that the height of the target object being greater than the height of the reference object and determining the target object as defective, and calculating the height of the target object as:
$\Delta H = ( d - D ) \times \tan (\theta)$, $H = H_S + \Delta H$, where $\theta$ equal to the first angle          ~S62

FIG. 1C

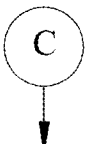

when the first movement distance being smaller than the second movement distance, the processing unit determining that the height of the target object being less than the height of the reference object and determining the target object as defective, and calculating the height of the target object as:
$\Delta H = ( D - d ) \times \tan (\theta)$, $H = H_S - \Delta H$, where $\theta$ is equal to the first angle          ~S63

FIG. 1D

Figure 8A:
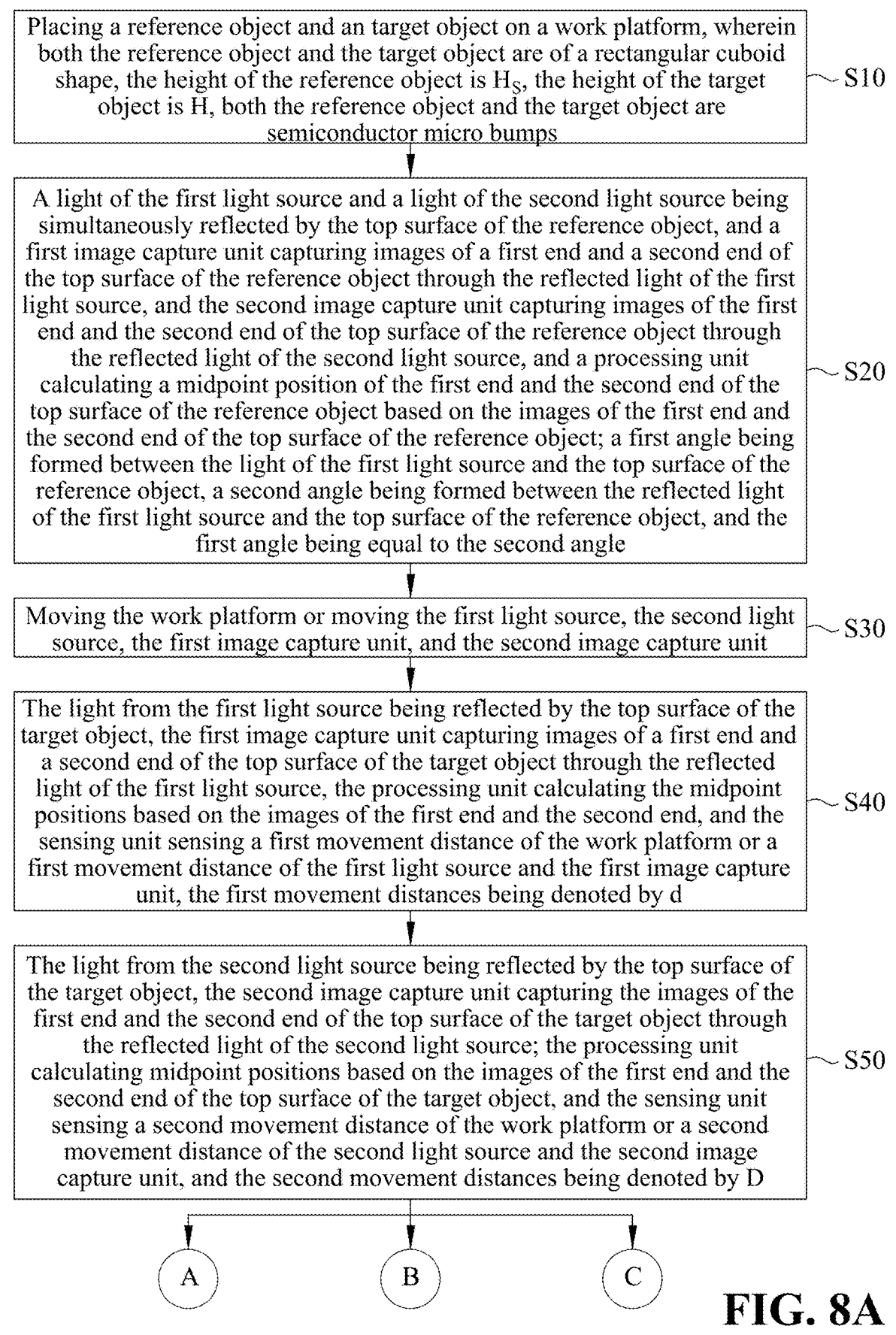

Placing a reference object and an target object on a work platform, wherein both the reference object and the target object are of a rectangular cuboid shape, the height of the reference object is $H_S$, the height of the target object is H, both the reference object and the target object are semiconductor micro bumps ~ S10

A light of the first light source and a light of the second light source being simultaneously reflected by the top surface of the reference object, and a first image capture unit capturing images of a first end and a second end of the top surface of the reference object through the reflected light of the first light source, and the second image capture unit capturing images of the first end and the second end of the top surface of the reference object through the reflected light of the second light source, and a processing unit calculating a midpoint position of the first end and the second end of the top surface of the reference object based on the images of the first end and the second end of the top surface of the reference object; a first angle being formed between the light of the first light source and the top surface of the reference object, a second angle being formed between the reflected light of the first light source and the top surface of the reference object, and the first angle being equal to the second angle ~ S20

Moving the work platform or moving the first light source, the second light source, the first image capture unit, and the second image capture unit ~ S30

The light from the first light source being reflected by the top surface of the target object, the first image capture unit capturing images of a first end and a second end of the top surface of the target object through the reflected light of the first light source, the processing unit calculating the midpoint positions based on the images of the first end and the second end, and the sensing unit sensing a first movement distance of the work platform or a first movement distance of the first light source and the first image capture unit, the first movement distances being denoted by d ~ S40

The light from the second light source being reflected by the top surface of the target object, the second image capture unit capturing the images of the first end and the second end of the top surface of the target object through the reflected light of the second light source; the processing unit calculating midpoint positions based on the images of the first end and the second end of the top surface of the target object, and the sensing unit sensing a second movement distance of the work platform or a second movement distance of the second light source and the second image capture unit, and the second movement distances being denoted by D ~ S50

When the first movement distance being equal to the second movement distance, a processing unit determining that a height of the target object being equal to the height of the reference object and the target object as non-defective ~S61

FIG. 8B

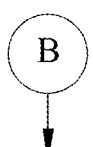

When the first movement distance being greater than the second movement distance, the processing unit determining that the height of the target object being greater than the height of the reference object and determining the target object as defective, and calculating the height of the target object as:
$\Delta H = ( d - D ) \times \tan (\theta)$, $H = H_S + \Delta H$, where $\theta$ equal to the first angle ~S62

FIG. 8C

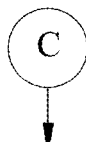

When the first movement distance being smaller than the second movement distance, the processing unit determining that the height of the target object being less than the height of the reference object and determining the target object as defective, and calculating the height of the target object as:
$\Delta H = ( D - d ) \times \tan (\theta)$, $H = H_S - \Delta H$, where $\theta$ is equal to the first angle ~S63

FIG. 8D

SEMICONDUCTOR MICRO BUMP HEIGHT MEASUREMENT METHOD

CROSS-REFERENCE TO RELATED APPLICATION

This application claims the priority of Taiwanese patent application No. 113133357, filed on Sep. 3, 2024, which is incorporated herewith by reference.

BACKGROUND OF THE INVENTION

1. Field of the Invention

The present invention relates generally to a measurement method, and more particularly, to a semiconductor micro bump height measurement method.

2. The Prior Arts

Semiconductor is a substance or material whose electrical conductivity is between that of metallic conductors and insulators. The surface of a semiconductor has some micro bumps, such as bonding pads, copper pillars, metal eutectics, metal contacts, etc. However, some of the micro bumps may be too high while some of the micro bumps may be too low, resulting in inconsistent heights of micro bumps. Micro bumps that are too high or too low are considered defects.

However, currently there is no detection method that can detect defects in semiconductor micro bumps.

SUMMARY OF THE INVENTION

A primary objective of the present invention is to provide a semiconductor micro bump height measurement method, which can accurately measure the height of a target object, so as to determine whether the target object has defects.

In order to achieve the aforementioned objective, the present invention provides a semiconductor micro bump height measurement method, which includes the following steps: placing a reference object and an target object on a work platform, wherein both the reference object and the target object are of a spherical shape, the height of the reference object is $H_s$, the height of the target object is H, both the reference object and the target object are semiconductor micro bumps; light of a first light source and light of a second light source being simultaneously reflected by the top of the reference object, a first image capture unit capturing an image of the top of the reference object through the reflected light of the first light source, and a second image capture unit capturing an image of the top of the reference object through the reflected light of the second light source; a first angle being formed between the light of the first light source and a horizontal plane passing through the top of the reference object, a second angle being formed between the reflected light of the first light source and the horizontal planes passing through the top of the reference object, and the first angle being equal to the second angle; moving the work platform or moving the first light source, the second light source, the first image capture unit, and the second image capture unit; the light of the first light source being reflected by the top of the target object, the first image capture unit capturing an image of the top of the target object by the reflected light of the first light source, and a sensing unit sensing a first movement distance of the work platform or a first movement distance of the first light source and the first image capture unit, and defining the first movement distance as d; the light of the second light source being reflected by the top of the target object, the second image capture unit capturing an image of the top of the target object by the reflected light of the second light source, and a sensing unit sensing a second movement distance of the work platform or a second movement distance of the second light source and the second image capture unit, and defining the second movement distance as D; and when the first movement distance being equal to the second movement distance, a processing unit determining that a height of the target object being equal to the height of the reference object and the target object as non-defective; when the first movement distance being greater than the second movement distance, the processing unit determining that the height of the target object being greater than the height of the reference object and determining the target object as defective, and calculating the height of the target object as: $\Delta H=(d-D)\times\tan(\theta)$, $H=H_s+\Delta H$, where $\theta$ equal to the first angle; when the first movement distance being smaller than the second movement distance, the processing unit determining that the height of the target object being less than the height of the reference object and determining the target object as defective, and calculating the height of the target object as: $\Delta H=(D-d)\times\tan(\theta)$, $H=H\_s-\Delta H$, where $\theta$ is equal to the first angle.

The effect of the present invention is that the method of the present invention can accurately measure the height of the target object, and can accurately determine whether the target object is defective based on the height difference between the reference object and the target object.

BRIEF DESCRIPTION OF THE DRAWINGS

The present invention will be apparent to those skilled in the art by reading the following detailed description of a preferred embodiment thereof, with reference to the attached drawings, in which:

FIGS. 1A to 1D are flow charts of the first embodiment of the method of the present invention.

FIGS. 8A to 8D are flow charts of a third embodiment of the method of the present invention.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 2:
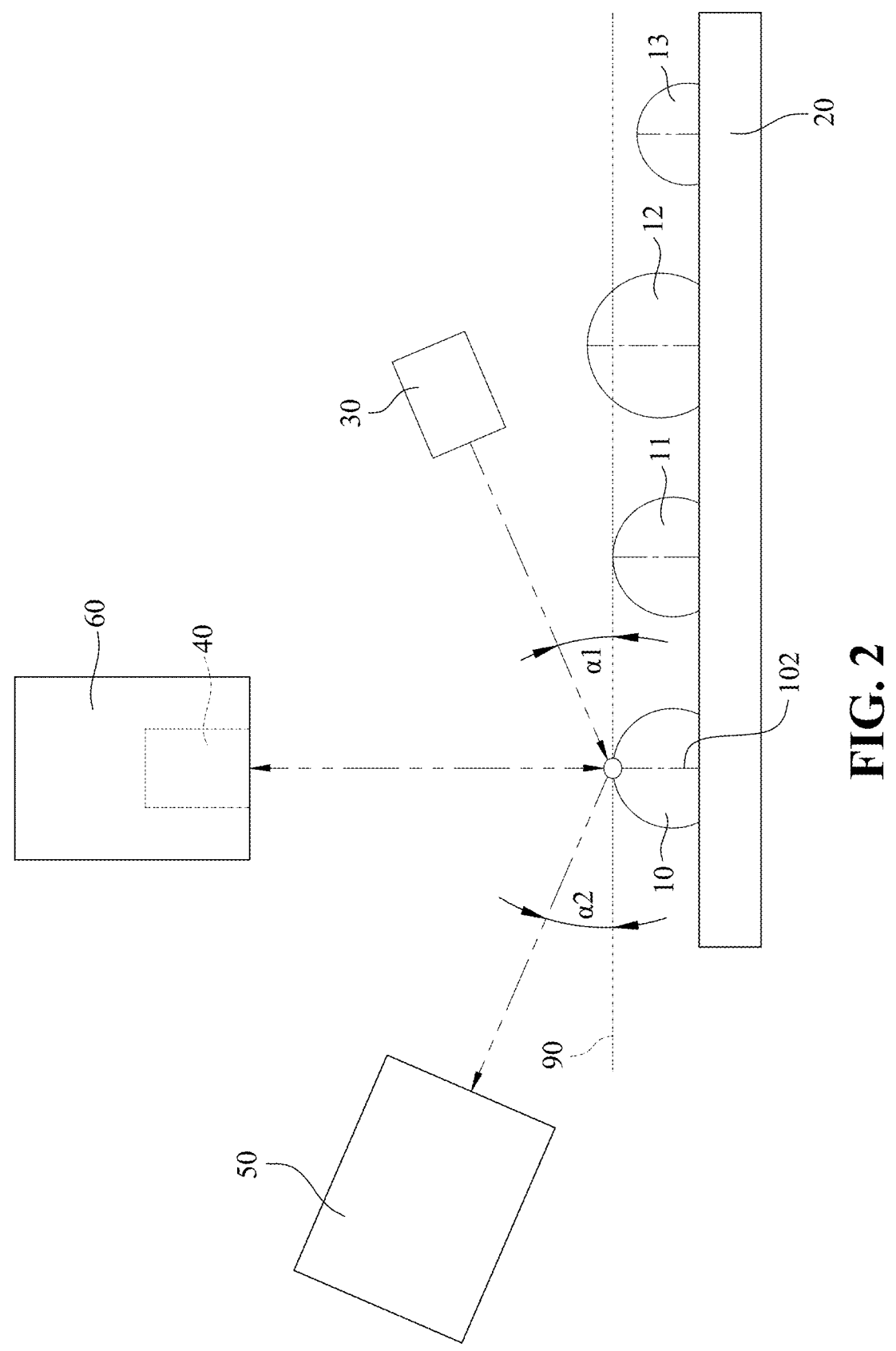
FIG. 2 is a schematic view of step S10 and step S20 of the first embodiment of the method of the present invention.
Figure 3:
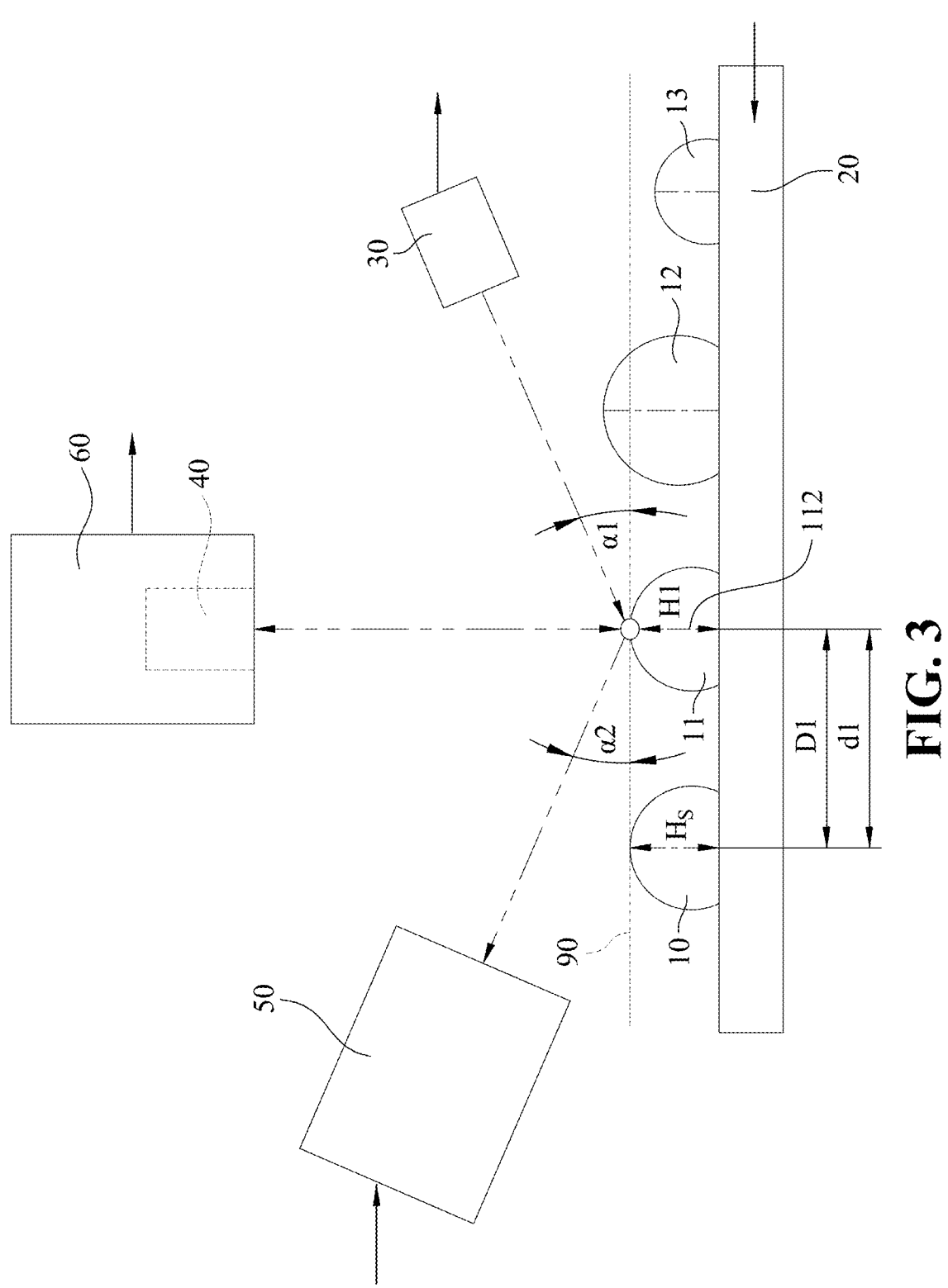
FIG. 3 is a schematic view of step S30, step S40, step S50 and step S61 of the first embodiment of the method of the present invention.
Figure 4:
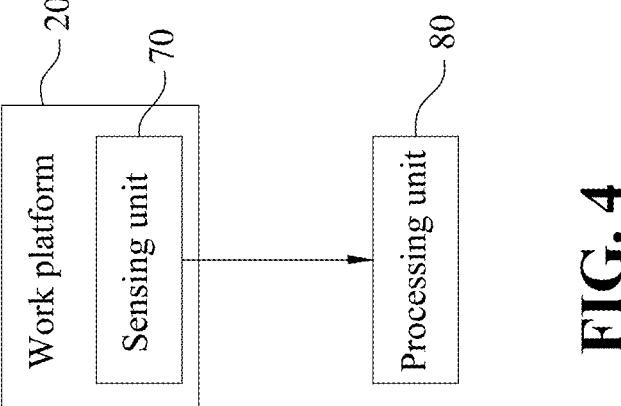
FIG. 4 is a schematic view of the connection relationship between the sensing unit and the processing unit of the present invention.

FIGS. 1A to 1D are flow charts of the first embodiment of the method of the present invention; FIG. 2 is a schematic view of step S10 and step S20 of the first embodiment of the method of the present invention; FIG. 3 is a schematic view of step S30, step S40, step S50 and step S61 of the first embodiment of the method of the present invention; FIG. 4 is a schematic view of the connection relationship between the sensing unit and the processing unit of the present invention; FIGS. 5A to 5D are schematic views of steps S30, S40, S50 and S62 of the first embodiment of the method of the present invention; and, FIGS. 6A to 6D are schematic views of steps S30, S40, S50 and S63 of the first embodiment of the method of the present invention. The present invention provides a semiconductor micro bump height measurement method, which includes the following steps:

Step S10, as shown in FIG. 1A and FIG. 2, a reference object 10 and a plurality of target objects 11, 12, 13 are set on a work platform 20. The shapes of the reference object 10 and the target objects 11, 12, 13 are all spherical. The height of the reference object 10 is $H_s$ (see FIG. 3), the height of the target object 11 is $H_1$ (see FIG. 3), the height of the target object 12 is $H_2$ (see FIG. 5D), and the height of the target object 13 is $H_3$ (see FIG. 6D). The reference object 10 and the test objects 11, 12, and 13 are all semiconductor micro bumps.

Step S20, as shown in FIG. 1A and FIG. 2, the light of a first light source 30 and the light of a second light source 40 are reflected by the top of the reference object 10 at the same time. A first image capture unit 50 uses the reflected light of the first light source 30 to capture an image of the top of the reference object 10, and a second image capture unit 60 uses the reflected light of the second light source 40 to capture an image of the top of the reference object 10. There exists a first angle α1 between the light of the first light source 30 and a horizontal plane 90 passing through the top of the reference object 10, and there exists a second angle α2 between the reflected light of the first light source 30 and the horizontal plane 90 passing through the top of the reference object 10, and the first angle α1 is equal to the second angle α2. Specifically, because the incident angle is the angle between the incident light ray and the normal line of the horizontal plane 90, the incident angle is equal to 90 degrees minus the first angle α1; in addition, because the reflection angle is the angle between the reflected light ray and the normal line of the horizontal plane 90 angle, so the reflection angle is equal to 90 degrees minus the second angle α2.

Step S30, as shown in FIGS. 1A, 3, 5A, 5B, 5C, 6A, 6B, and 6C, move the work platform 20 or move the first light source 30, the second light source 40, the first image capture capturing unit 50, and the second image capture unit 60.

Step S40, as shown in FIGS. 1A, 3, 4, 5A, 5C, 6B, and 6C, the light of the first light source 30 is reflected by the top of the target object 11, 12, 13, and the first image capture unit 50 captures an image of the top of the target object 11, 12, 13 through the reflected light of the first light source 30, and a sensing unit 70 senses a first movement distance of the work platform 20, or a first movement distance of the first light source 30 and the first image capture unit 50, and the first movement distances are denoted as d1, d2, and d3, respectively.

Step S50, as shown in FIGS. 1A, 3, 4, 5B, 5C, 6A, and 6C, the light from the second light source 40 is reflected by the top of the target object 11, 12, 13, and the second image capture unit 60 captures an image of the top of the target object 11, 12, 13 through the reflected light of the second light source 40, and the sensing unit 70 senses a second movement distance of the work platform 20 or a second movement distance of the second light source 40 and the second image capture unit 60, and the second movement distances are denoted as D1, D2, and D3, respectively Step S61, as shown in FIGS. 1B, 3, and 4, when the first movement distance d1 is equal to the second movement distance D1, a processing unit 80 determines that the height H1 of the target object 11 is equal to the height $H_s$ of the reference object 10 and determines that the target object 11 is a good product, i.e., not a defect.

Step S62, as shown in FIGS. 1C, 4, and 5A-5D, when the first movement distance d2 is greater than the second movement distance D2, the processing unit 80 determines that the height H2 of the target object 12 is greater than the height HS of the reference object 10 and determines that the target object 12 is defective, and the height H2 of the target object 12 is calculated according to the following formula: $\Delta H2=(d2-D2)\times\tan(\theta)$, $H2=Hs+\Delta H2$, where θ is equal to the first angle α1.

Step S63, as shown in FIGS. 1D, 4, and 6A-6D, when the first movement distance d3 is less than the second movement distance D3, the processing unit 80 determines that the height H3 of the target object 13 is less than the height $H_s$ of the reference object 10 and determines that the target object 13 is defective, and the height H3 of the target object 13 is calculated according to the following formula: $\Delta H3=(D3-d3)\times\tan(\theta)$, $H3=Hs-\Delta H3$, where θ is equal to the first angle α1.

Figure 5A:
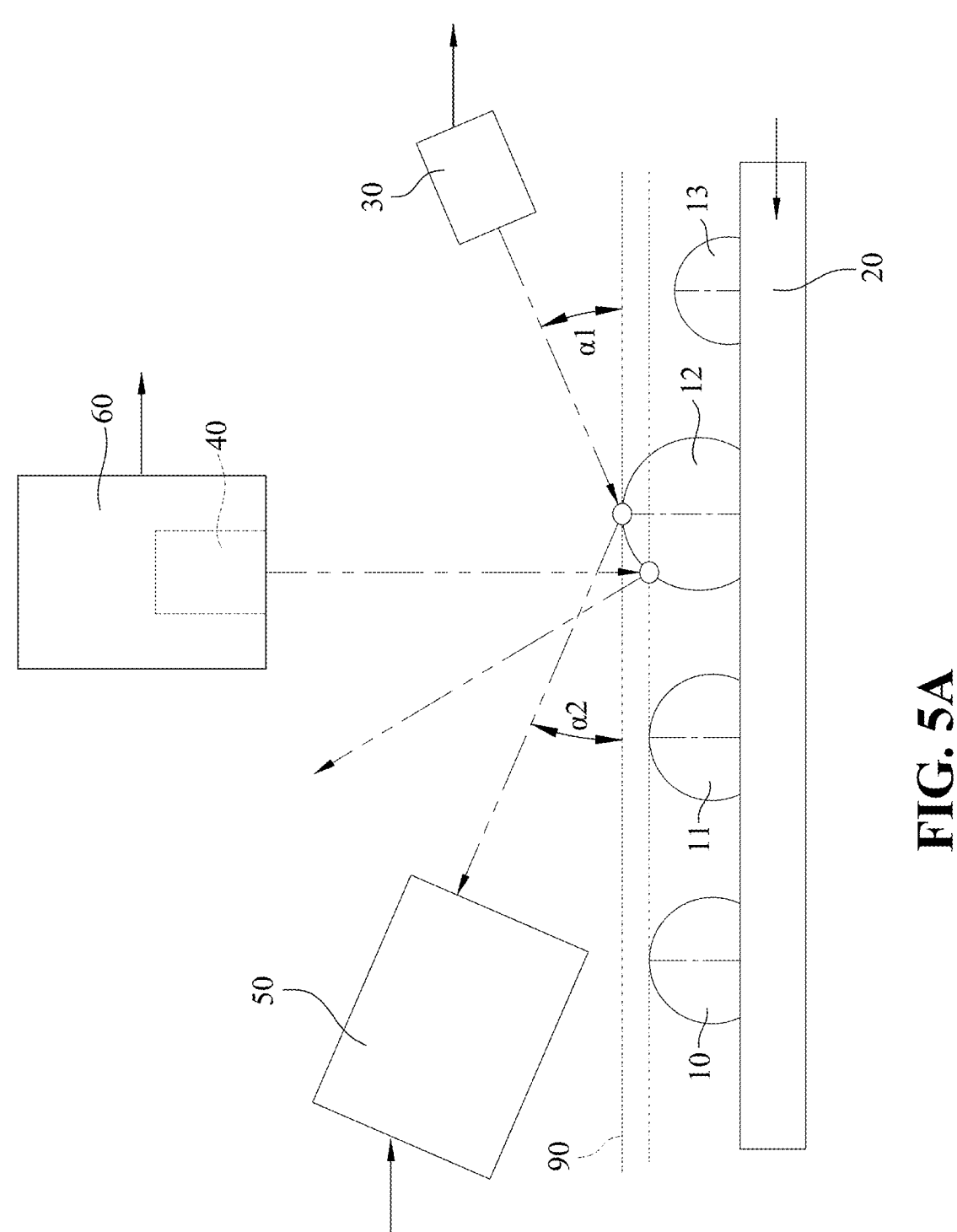
FIGS. 5A to 5D are schematic views of steps S30, S40, S50 and S62 of the first embodiment of the method of the present invention.
Figure 5B:
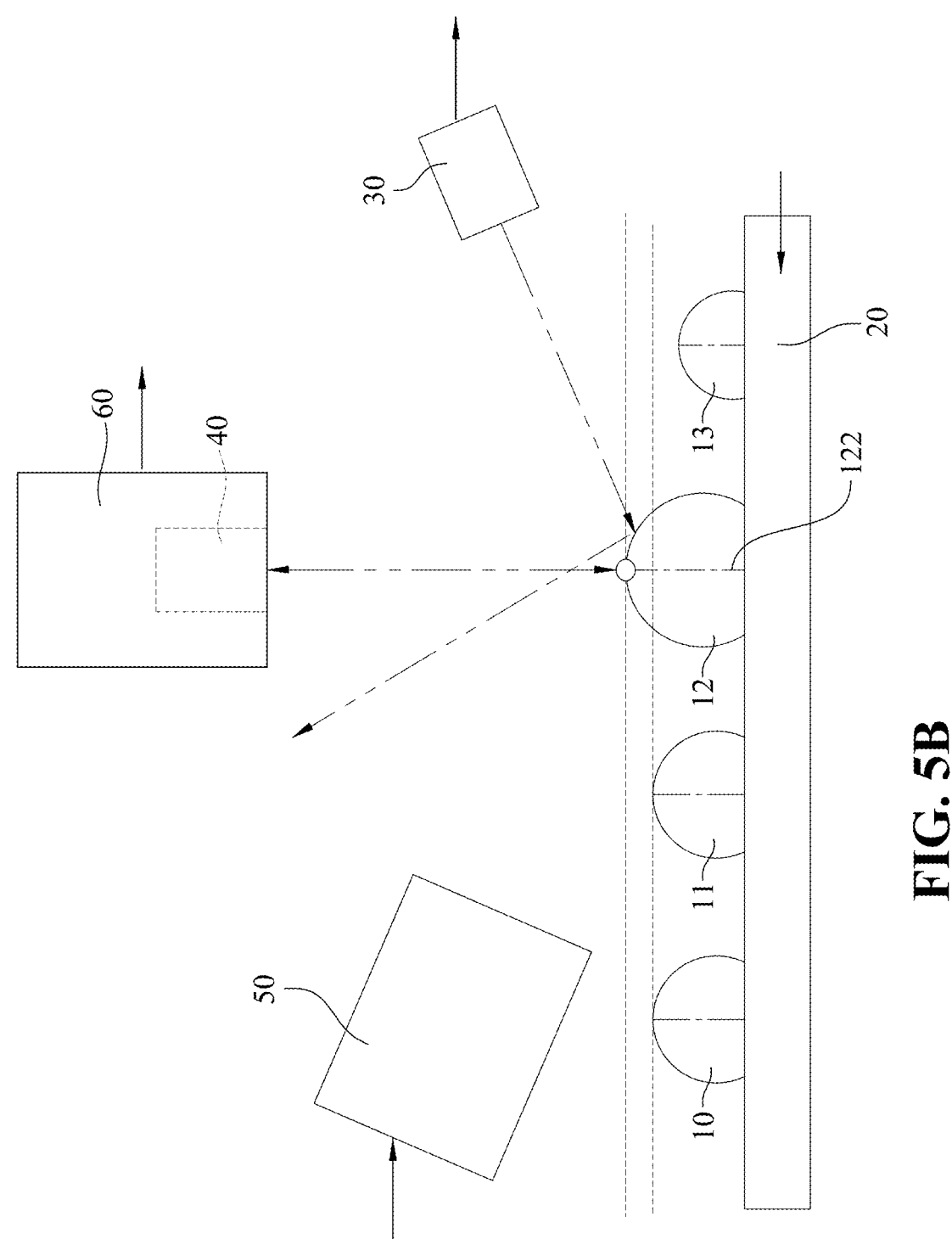
Figure 5C:
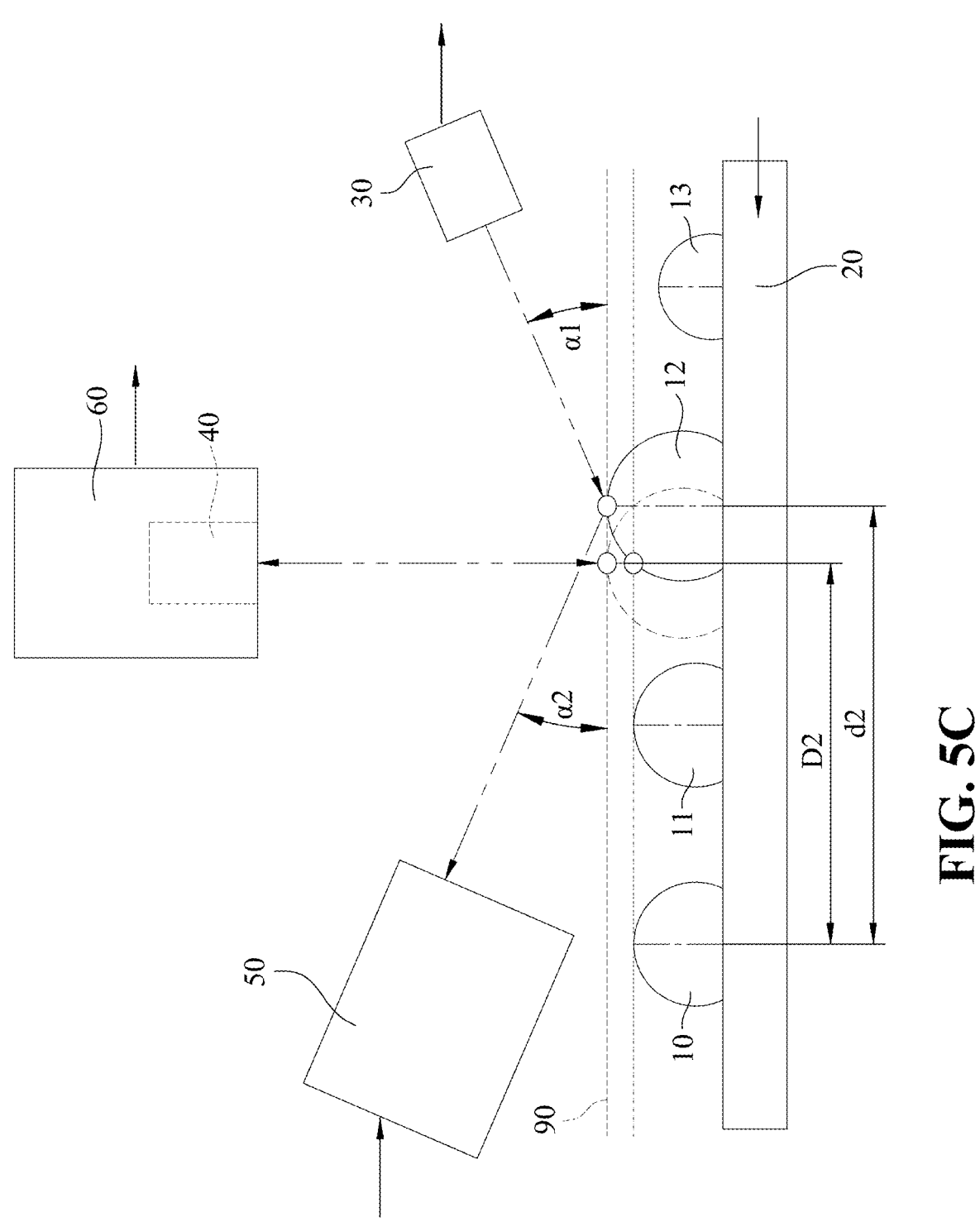
Figure 5D:
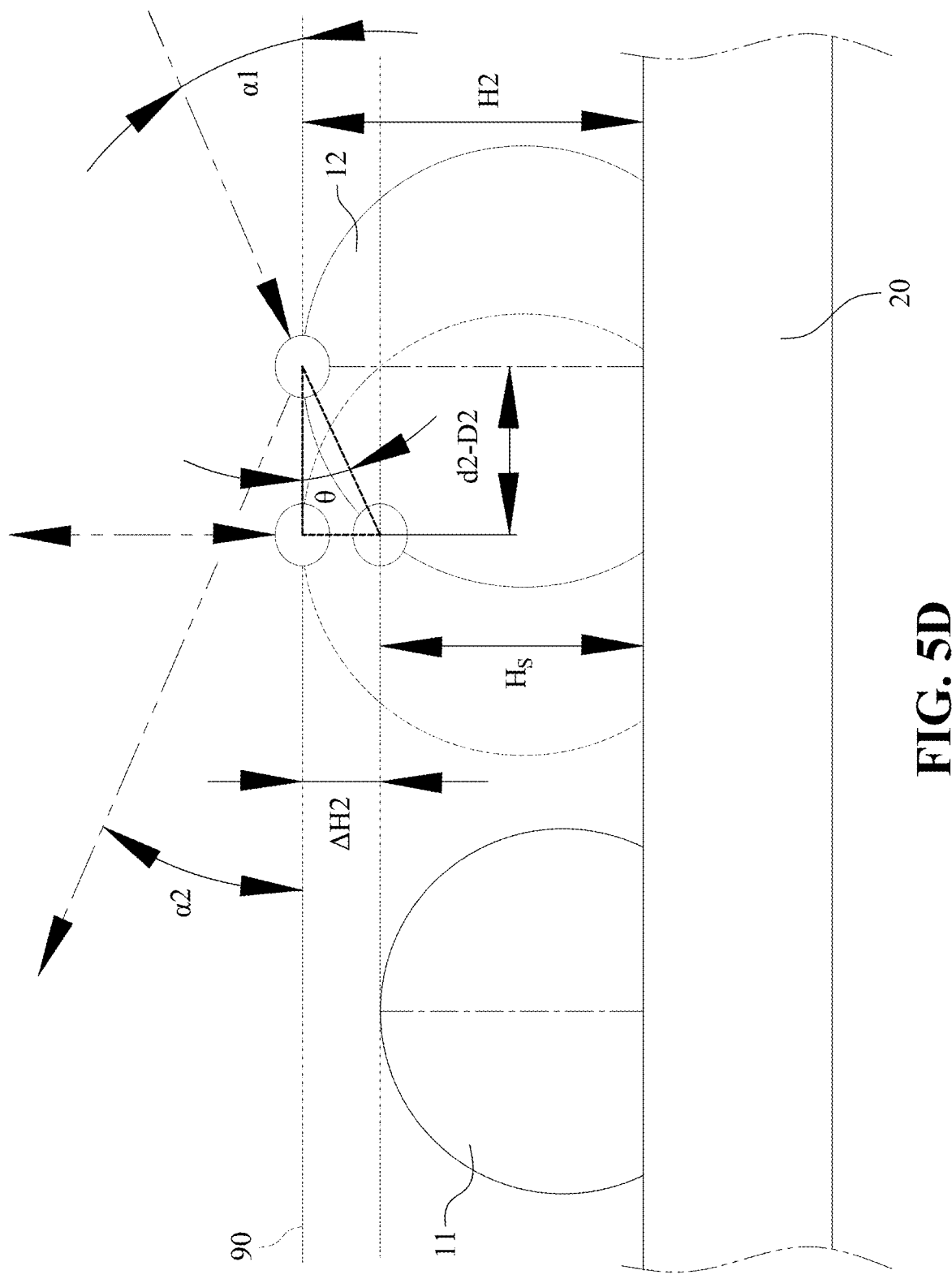
Figure 6A:
FIGS. 6A to 6D are schematic views of steps S30, S40, S50 and S63 of the first embodiment of the method of the present invention.
Figure 6B:
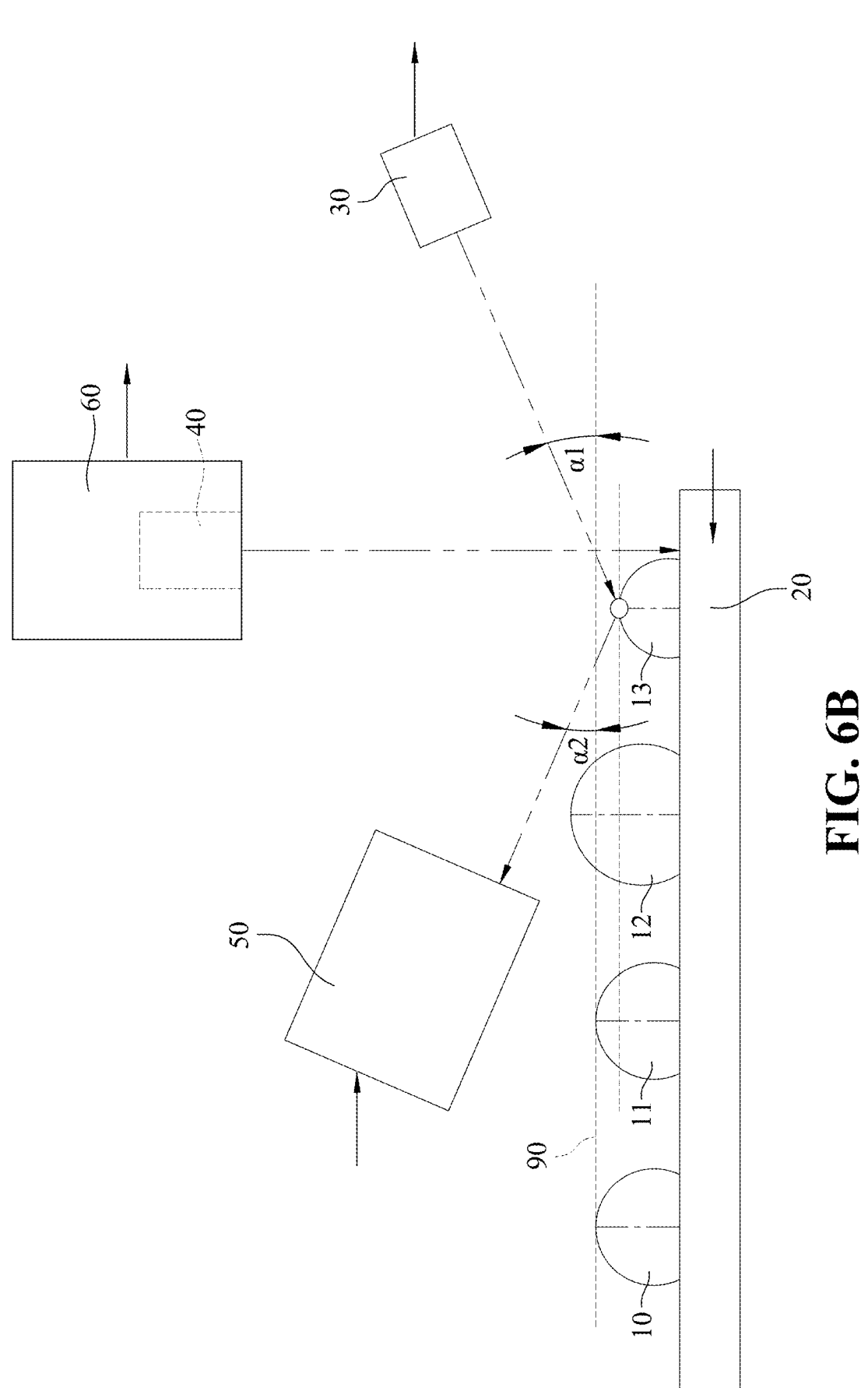
Figure 6C:
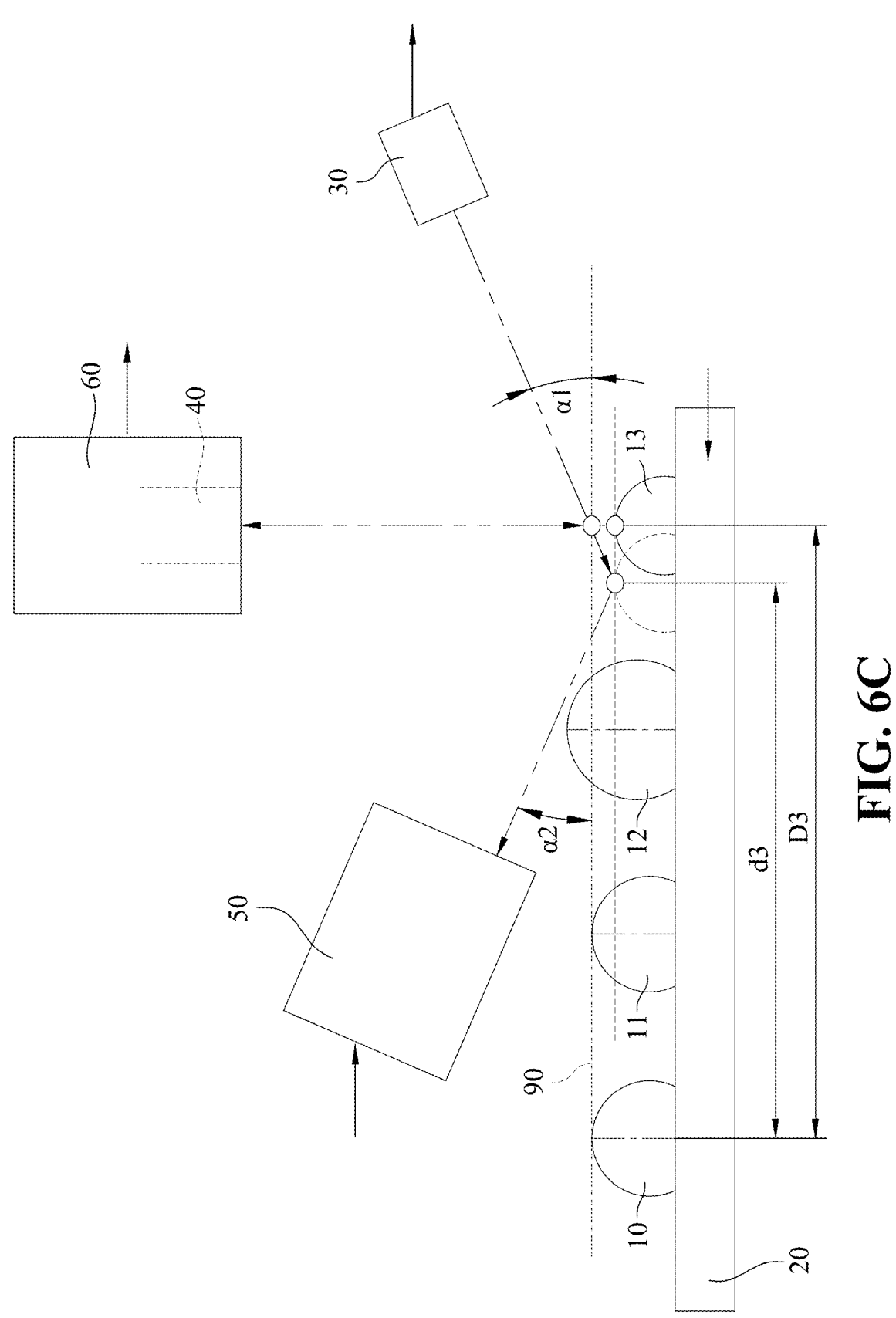
Figure 6D:
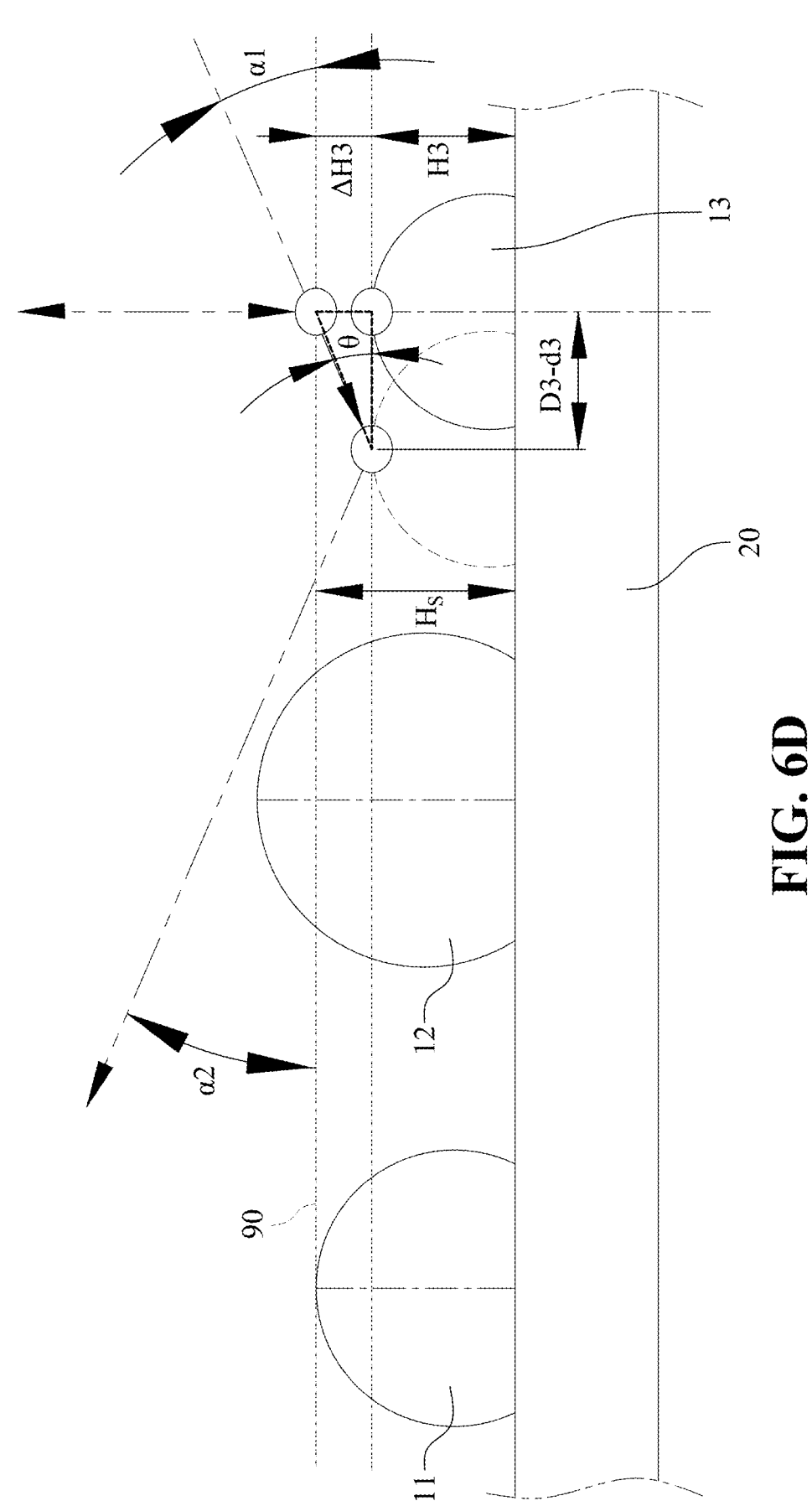

In the first embodiment, in step S20, as shown in FIG. 2, the light of the second light source 40 and the reflected light of the second light source 40 overlap with an axis 102 of the reference object 10. In step S50, as shown in FIGS. 3, 5B, and 6A, the light of the second light source 40 and the reflected light of the second light source 40 overlap with an axis 112, 122, 132 of the target object 11, 12, 13.

If the work platform 20 accelerates or the first light source 30, the second light source 40, the first image capture unit 50, and the second image capture unit 60 accelerate, then the moving speed of the work platform 20 or the moving speed of the first light source 30, the second light source 40, the first image capture unit 50, and the second image capture unit 60 become unsteady, which causes the first image capture unit 50 unable to clearly capture the image of the top of the target objects 11, 12, and 13 through the reflected light of the first light source 30, and causing the second image capture unit 60 unable to clearly capture the image of the top of the target objects 11, 12, and 13 through the reflected light of the second light source 40. Preferably, in step S30, the work platform 20 moves at a constant speed or the first light source 30, the second light source 40, the first image capture unit 50, and the second image capture unit 60 move at a constant speed. Therefore, the moving speeds of the first light source 30, the second light source 40, the first image capture unit 50, and the second image capture unit 60 are quite stable, so the first image capture unit 50 can use the reflected light of the first light source 30 to clearly capture the image of the top of the target objects 11, 12, 13, and the second image capture unit 60 can clearly capture the image of the top of the target objects 11, 12, 13 through the reflected light of the second light source 40.

Preferably, the semiconductor micro bumps are bonding pads, copper pillars, metal eutectics, or metal contacts.

Figure 7:
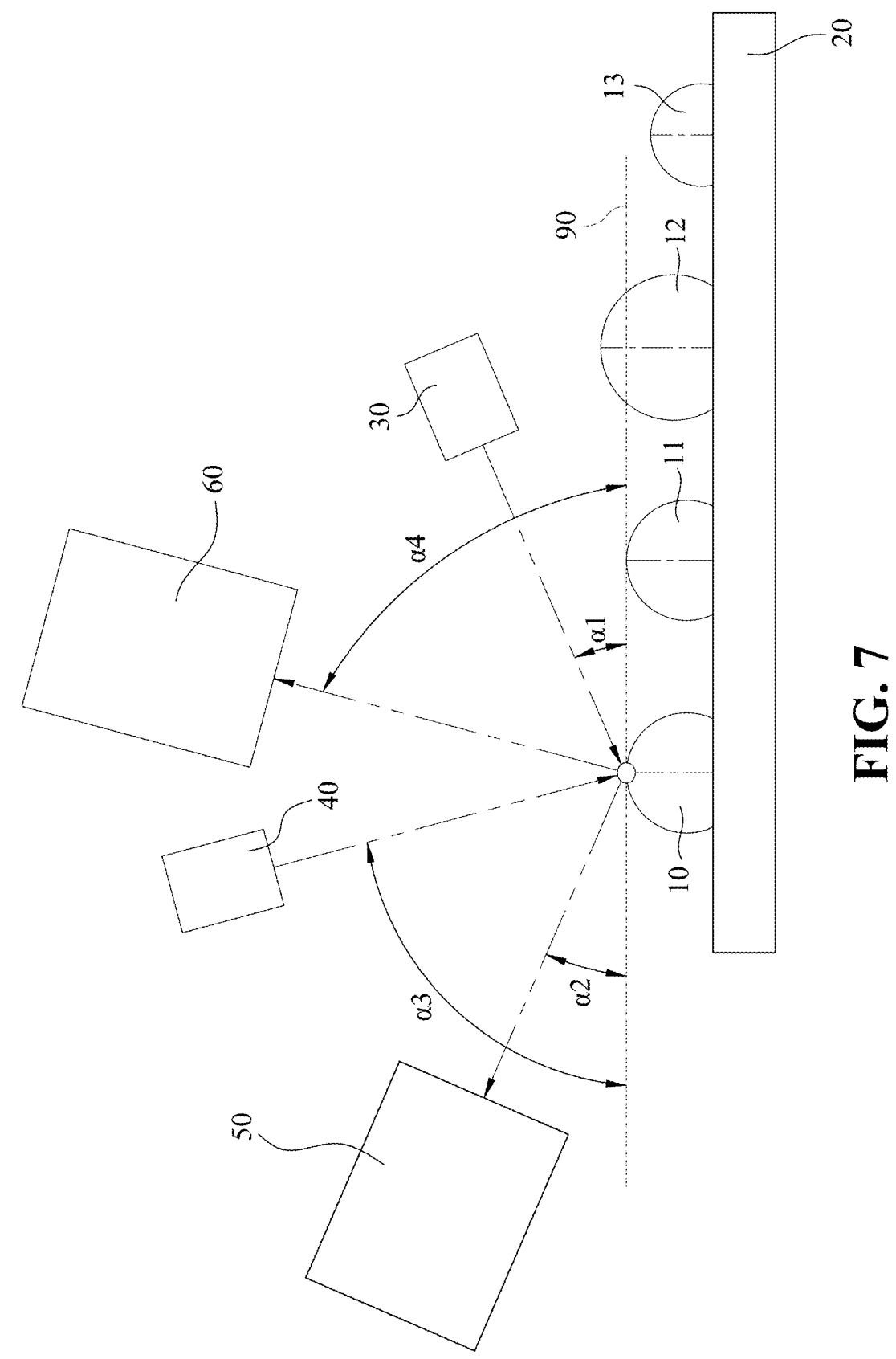
FIG. 7 is a schematic view of step S10 and step S20 of a second embodiment of the method of the present invention.

FIG. 7 is a schematic view of step S10 and step S20 of the second embodiment of the method of the present invention. The difference between the second embodiment and the first embodiment is that in step S20, as shown in FIG. 7, there is a third angle α3 between the light of the second light source 40 and the horizontal plane 90 passing through the top of the reference object 10, there is a fourth angle α4 between the reflected light 40 and the horizontal plane 90 passing through the top of the reference object 10, and the third angle α3 is equal to the fourth angle α4. Specifically, because the incident angle is the angle between the incident light ray and the normal line of the horizontal plane 90, the incident angle is equal to 90 degrees minus the third angle α3; and, because the reflection angle is the angle between the reflected light ray and the normal line of the horizontal plane 90 angle, so the reflection angle is equal to 90 degrees minus the fourth angle α4. Other than this, the remaining technical features of the second embodiment are identical to those of the first embodiment.

Figure 9A:
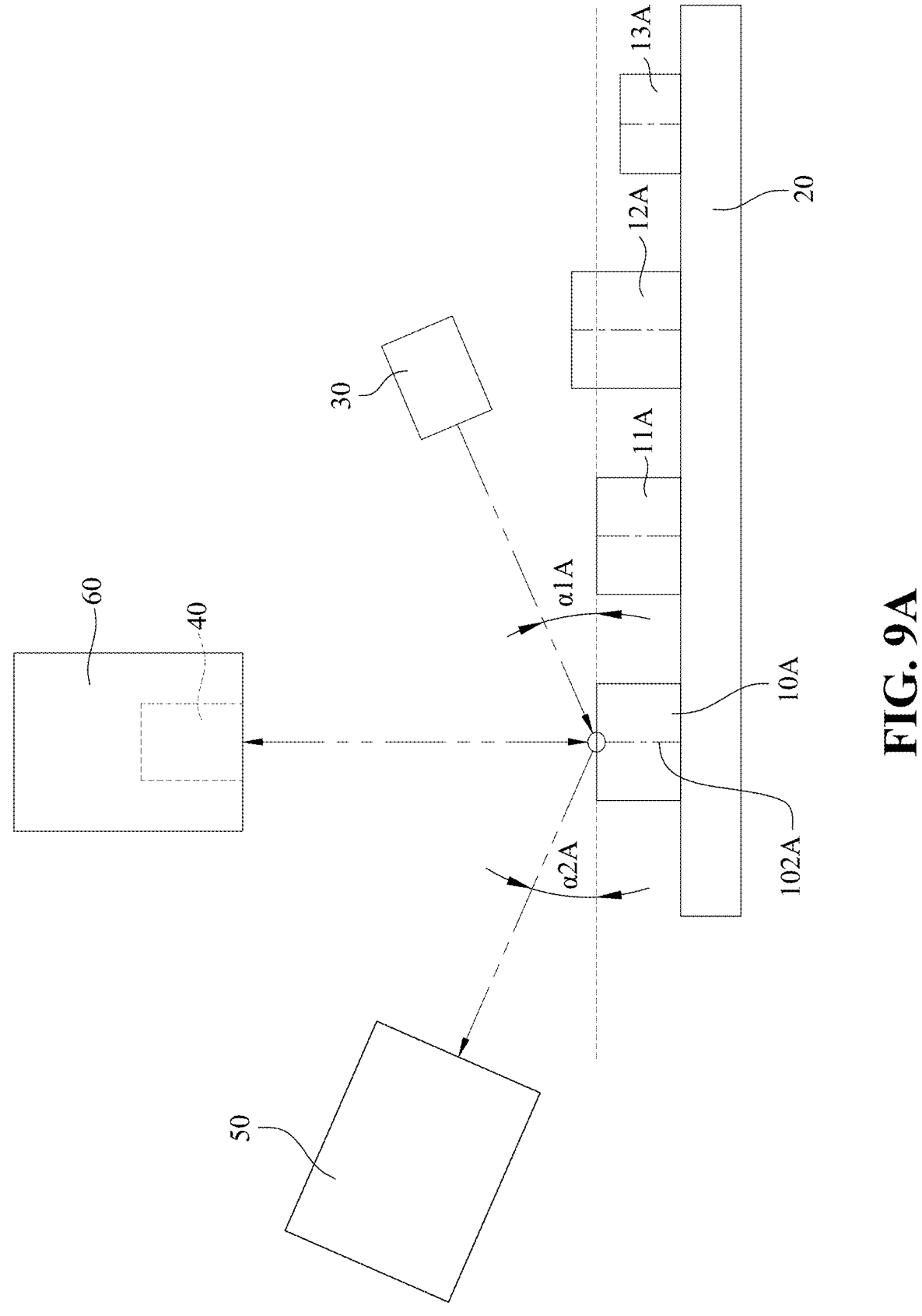
FIGS. 9A and 9B are schematic views of steps S10 and S20 of the third embodiment of the method of the present invention.
Figure 10:
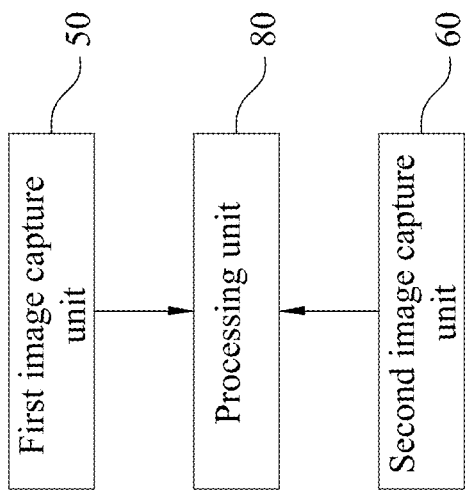
FIG. 10 is a schematic view of the connection relationship between the first image capture unit, the second image capture unit, and the processing unit of the present invention.
Figure 9B:
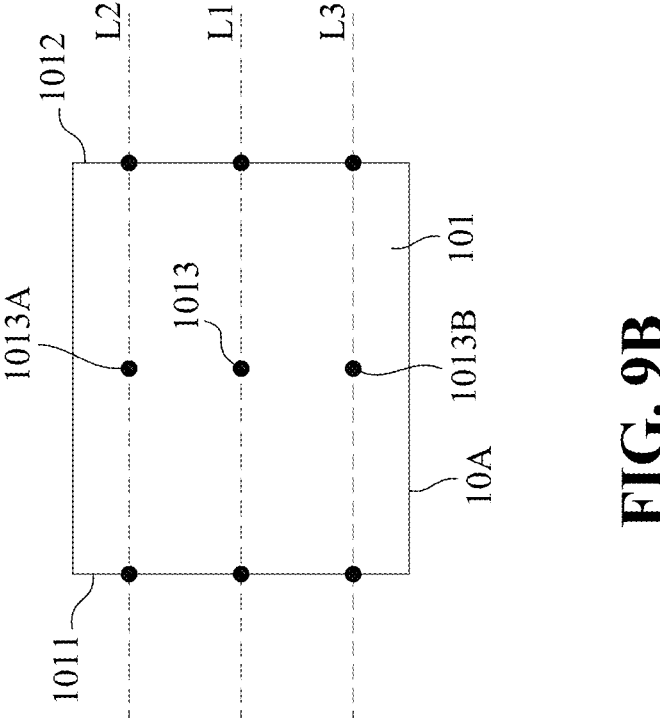
Figure 11A:
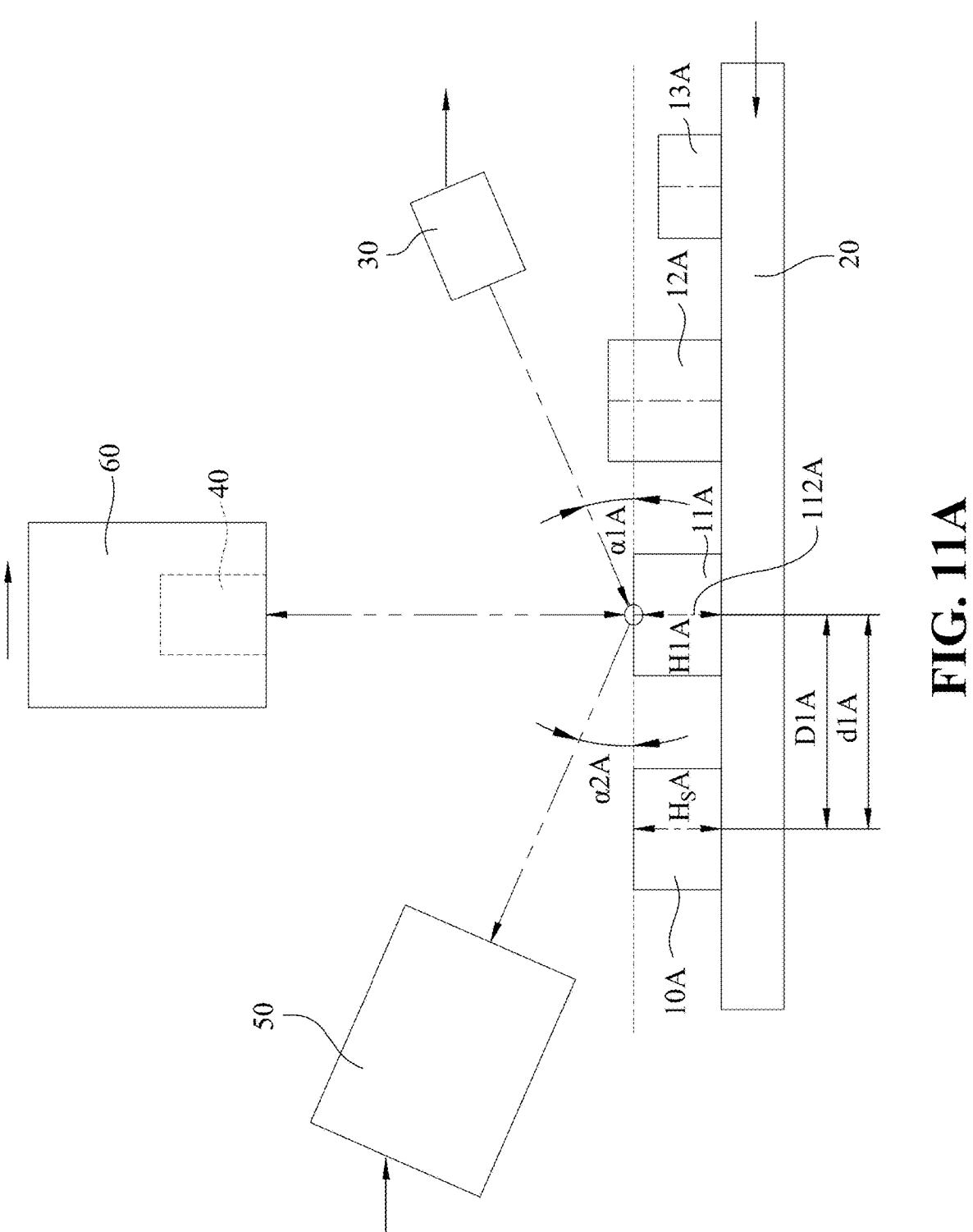
FIGS. 11A and 11B are schematic views of steps S30, S40, S50 and S61 of the third embodiment of the method of the present invention.
Figure 11B:
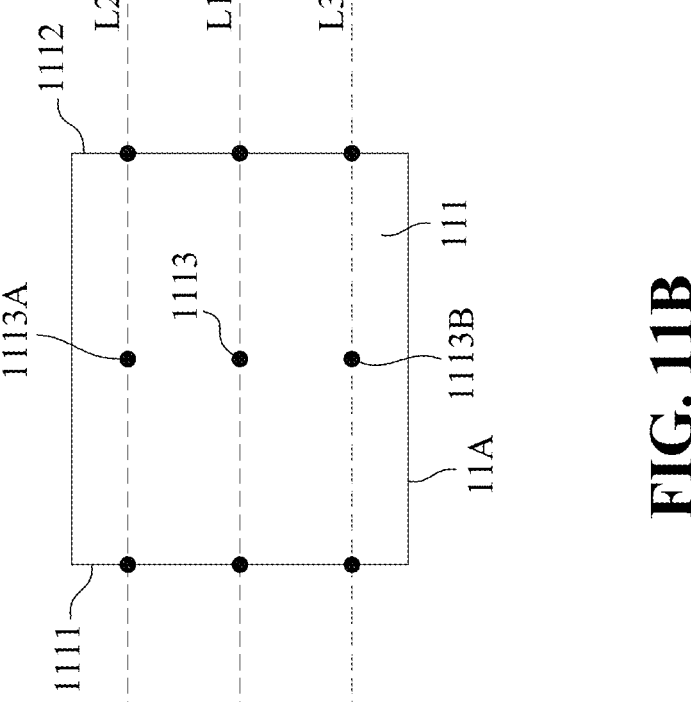

FIGS. 8A to 8D are flow charts of a third embodiment of the method of the present invention; FIGS. 9A and 9B are schematic views of steps S10 and S20 of the third embodiment of the method of the present invention; FIG. 10 is a schematic view of the connection relationship between the first image capture unit, the second image capture unit, and the processing unit of the present invention; FIGS. 11A and 11B are schematic views of steps S30, S40, S50 and S61 of the third embodiment of the method of the present invention; FIGS. 12A to 12F are schematic views of steps S30, S40, S50 and S62 of the third embodiment of the method of the present invention; and, FIGS. 13A to 13F are schematic views of steps S30, S40, S50 and S63 of the third embodiment of the method of the present invention. The present invention provides a semiconductor micro bump height measurement method, which includes the following steps:

Step S10, as shown in FIG. 8A and FIG. 9A, a reference object 10A and a plurality of target objects 11A, 12A, 13A are set on a work platform 20. The shapes of the reference object 10A and the target objects 11A, 12A, 13A are all rectangular cuboid or cuboid. The height of the reference object 10A is $H_sA$ (see FIG. 11A), the height of the target object 11A is $H_1A$ (see FIG. 11A), the height of the target object 12A is H2A (see FIG. 12F), and the height of the target object 13A is $H_3A$ (see FIG. 13F). The reference object 10A and the test objects 11A, 12A, and 13A are all semiconductor micro bumps.

Step S20, as shown in FIG. 8A, FIG. 9A, FIG. 9B, and FIG. 10, the light of the first light source 30 and the light of the second light source 40 are reflected by the top surface 101 of the reference object 10A at the same time, and the first image capture unit 50 captures images of a first end 1011 and a second end 1012 of the top surface 101 of the reference object 10A through the reflected light of the first light source 30, and the second image capture unit 60 captures images of the first end 1011 and the second end 1012 of the top surface 101 of the reference object 10A through the reflected light of the second light source 40, and a processing unit 80 calculates a midpoint position 1013, 1013A, and 1013B of the first end 1011 and the second end 1012 of the top surface 101 of the reference object 10A based on the images of the first end 1011 and the second end 1012 of the top surface 101 of the reference object 10A. More specifically, as shown in FIG. 9B, the light of the first light source 30 and the light of the second light source 40 may illuminate the top surface 101 of the reference object 10A along a center line L1. At this time, the midpoint position 1013 is exactly on the axis position of the reference object 10A; the light of the first light source 30 and the light of the second light source 40 may also illuminate the top surface 101 of the reference object 10A along an eccentric line L2, L3. At this time, the midpoint positions 1013A and 1013B are exactly at the eccentric position of the reference object 10A. There is a first angle α1A between the light of the first light source 30 and the top surface of the reference object 10A. There is a second angle α2A between the reflected light of the first light source 30 and the top surface of the reference object 10A. The first angle α1A is equal to the second angle α2A. Specifically, because the incident angle is the angle between the incident light ray and the normal line of the top surface of the reference object 10A, the incident angle is equal to 90 degrees minus the first angle α1A; and, because the reflection angle is the angle between the reflected light ray and the top surface of the reference object 10A, the reflection angle is equal to 90 degrees minus the second angle α2A.

Step S30, as shown in FIGS. 8A, 11A, 12A, 12B, 12C, 12E, 13A, 13B, 13C, and 13E, move the work platform 20 or move the first light source 30, the second light source 40, the first image capture unit 50, and the second image capture unit 60.

Figure 12A:
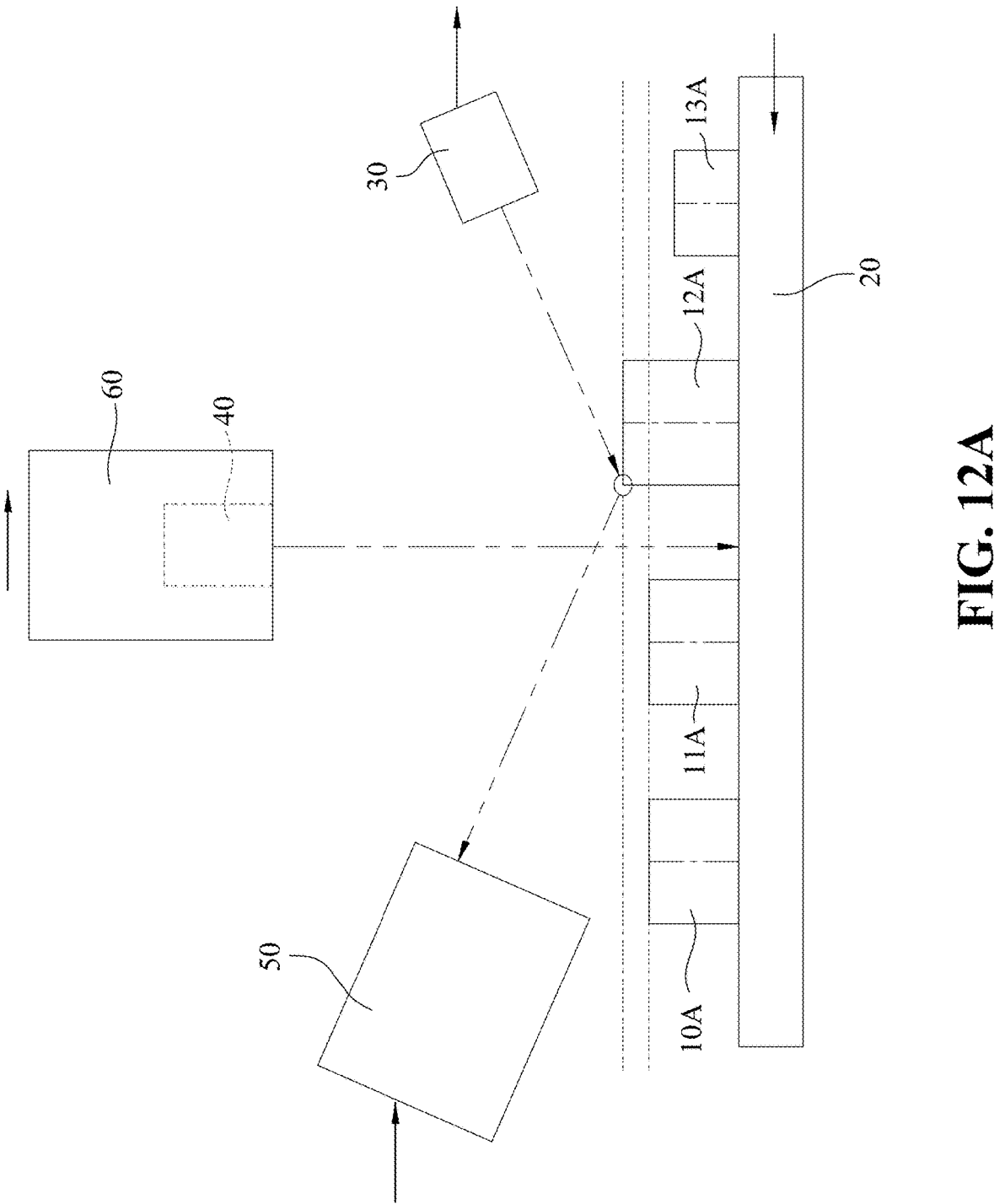
FIGS. 12A to 12F are schematic views of steps S30, S40, S50 and S62 of the third embodiment of the method of the present invention.
Figure 12B:
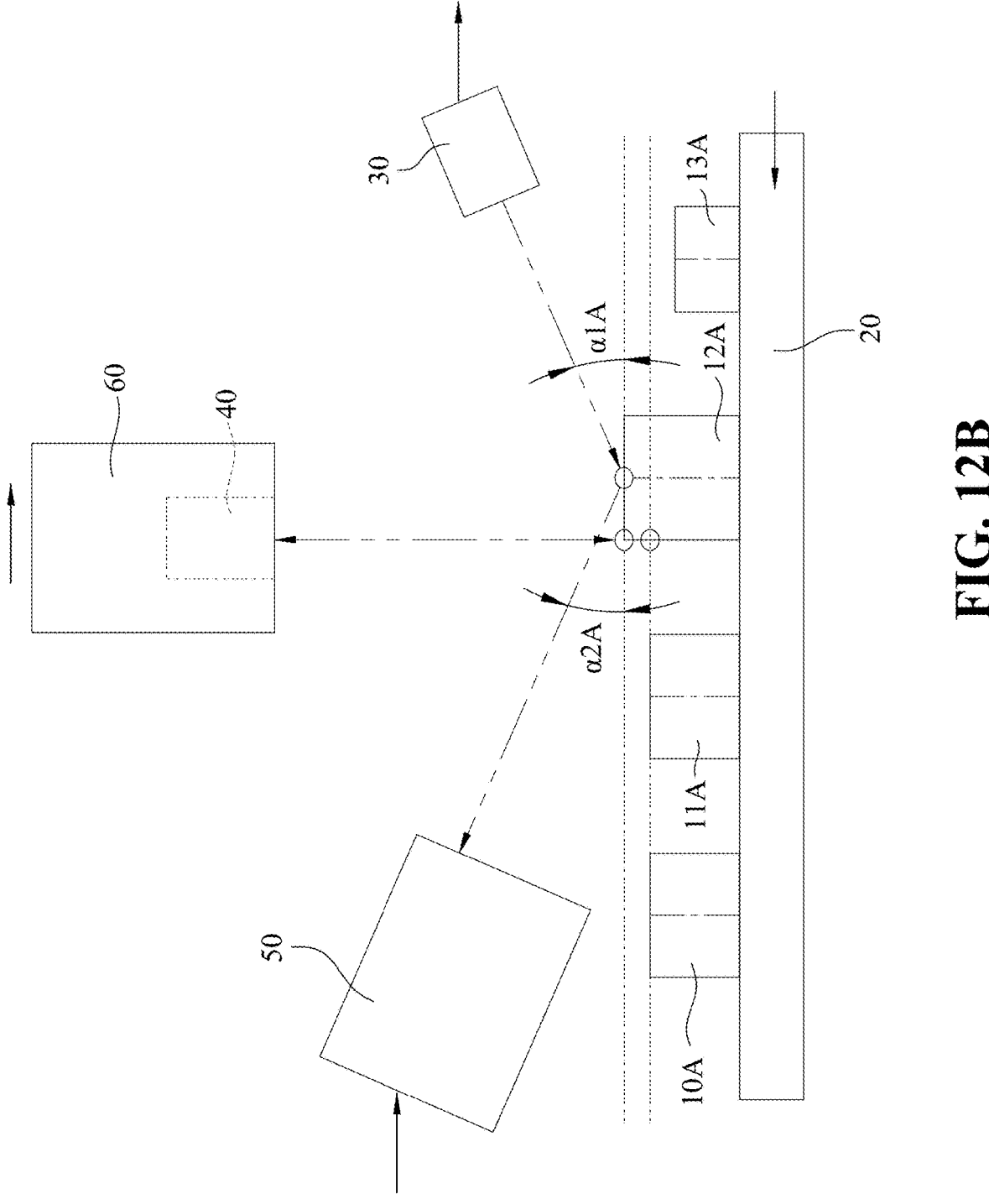
Figure 12C:
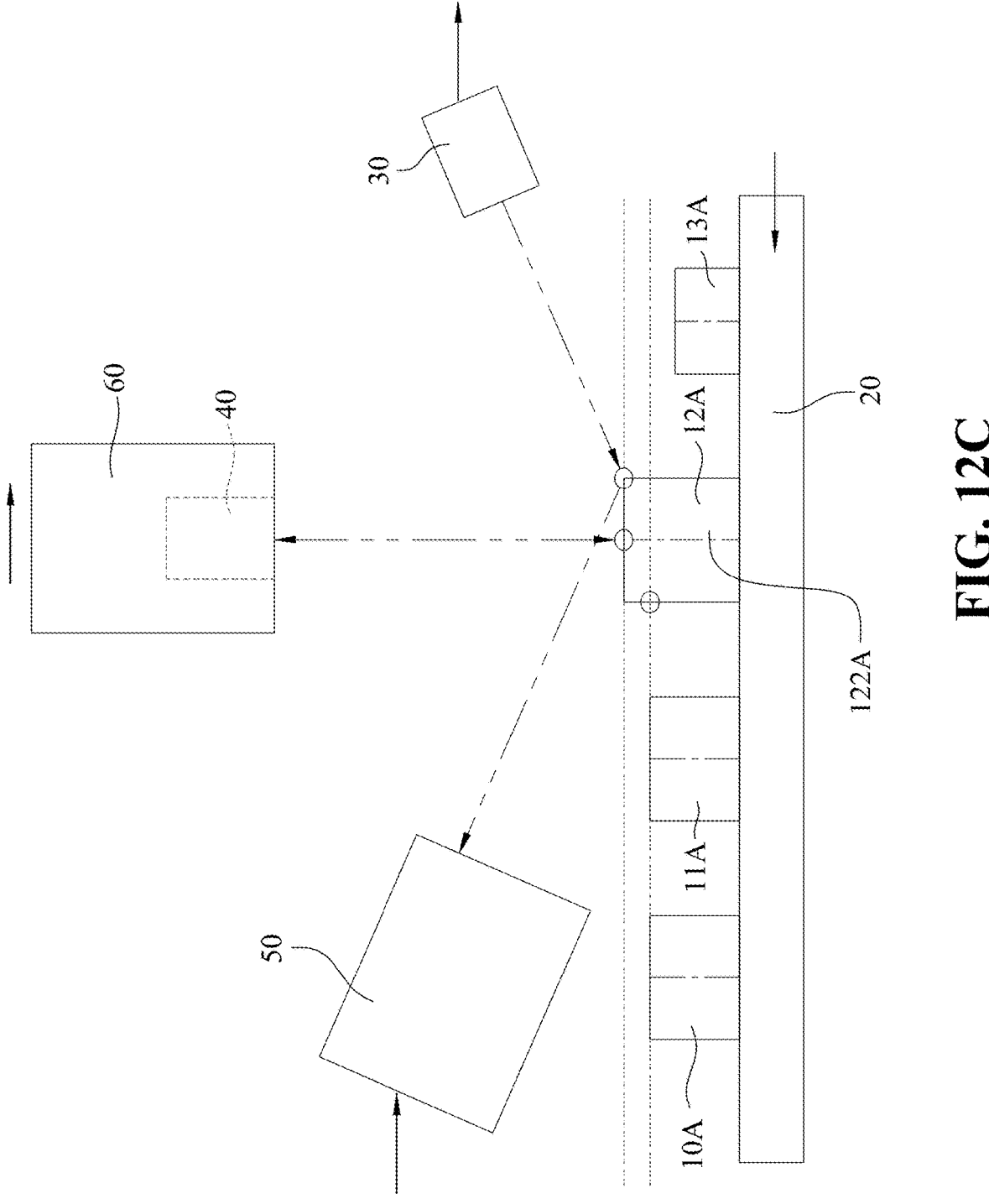
Figure 12D:
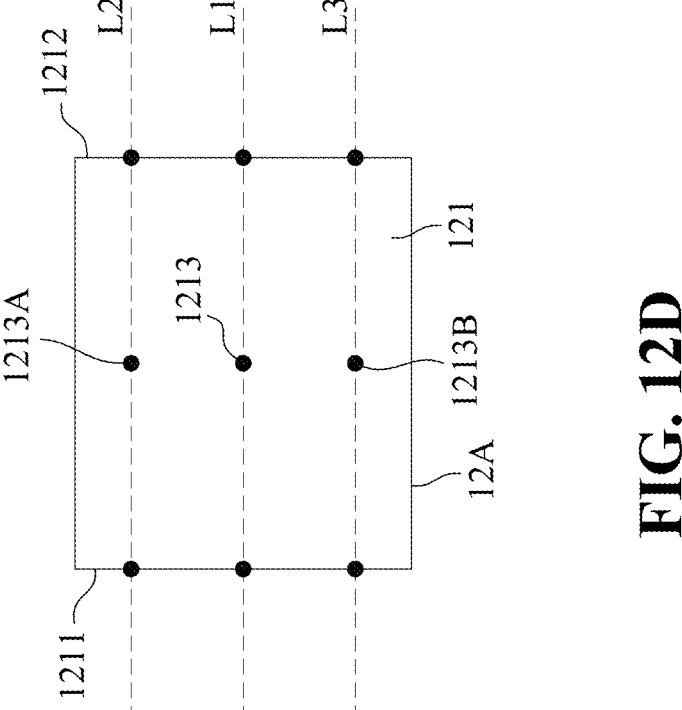
Figure 12E:
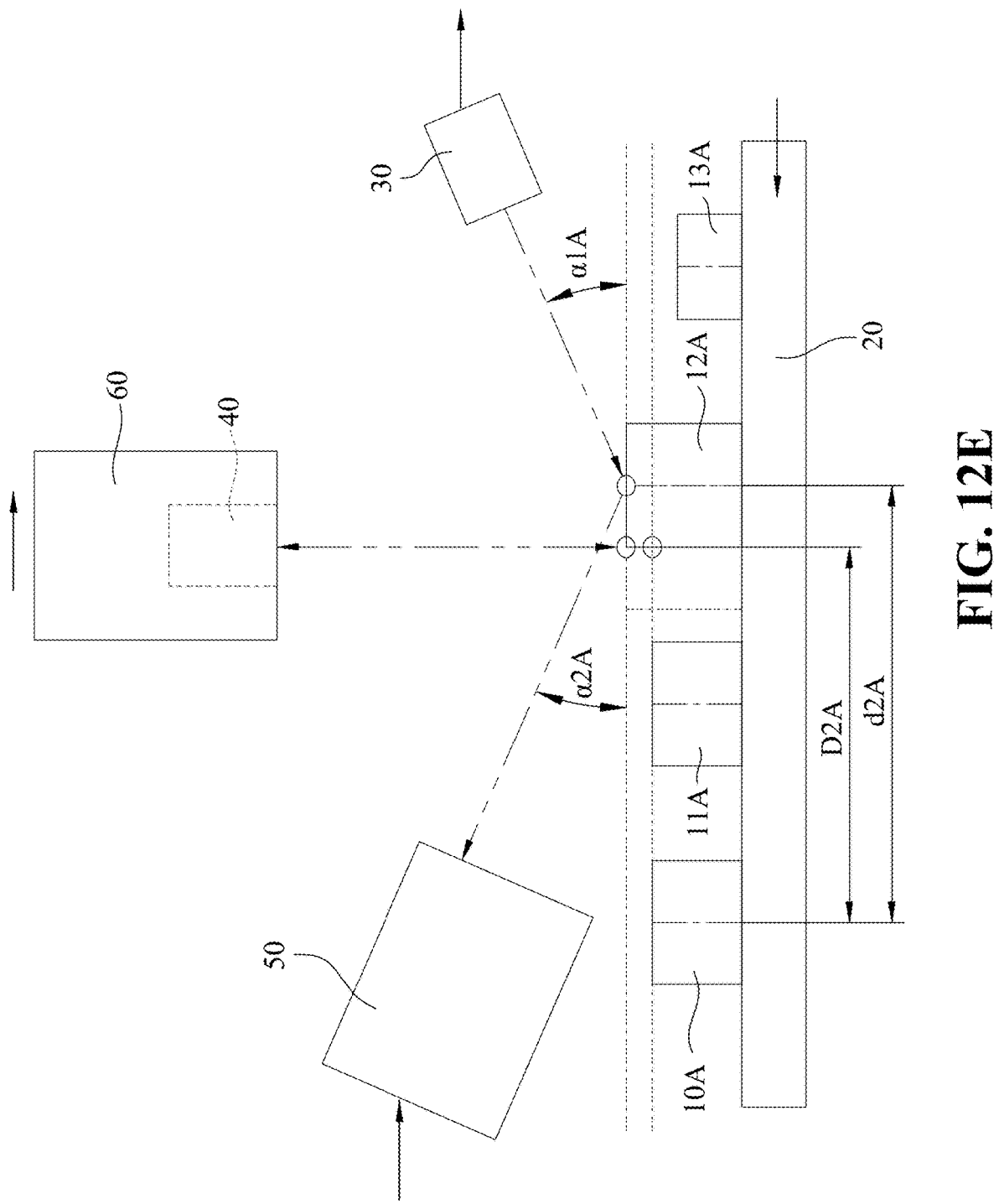
Figure 12F:
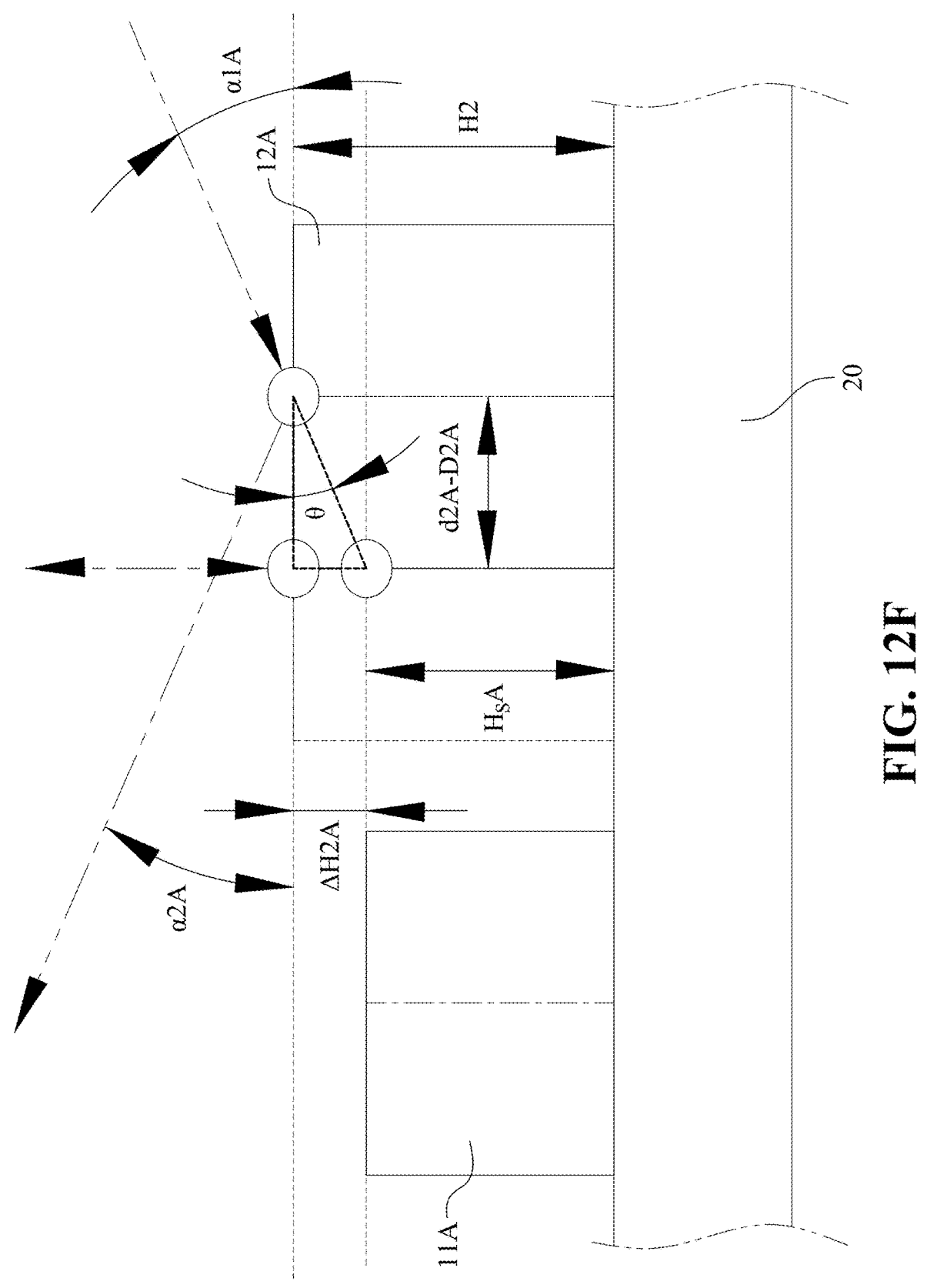
Figure 13A:
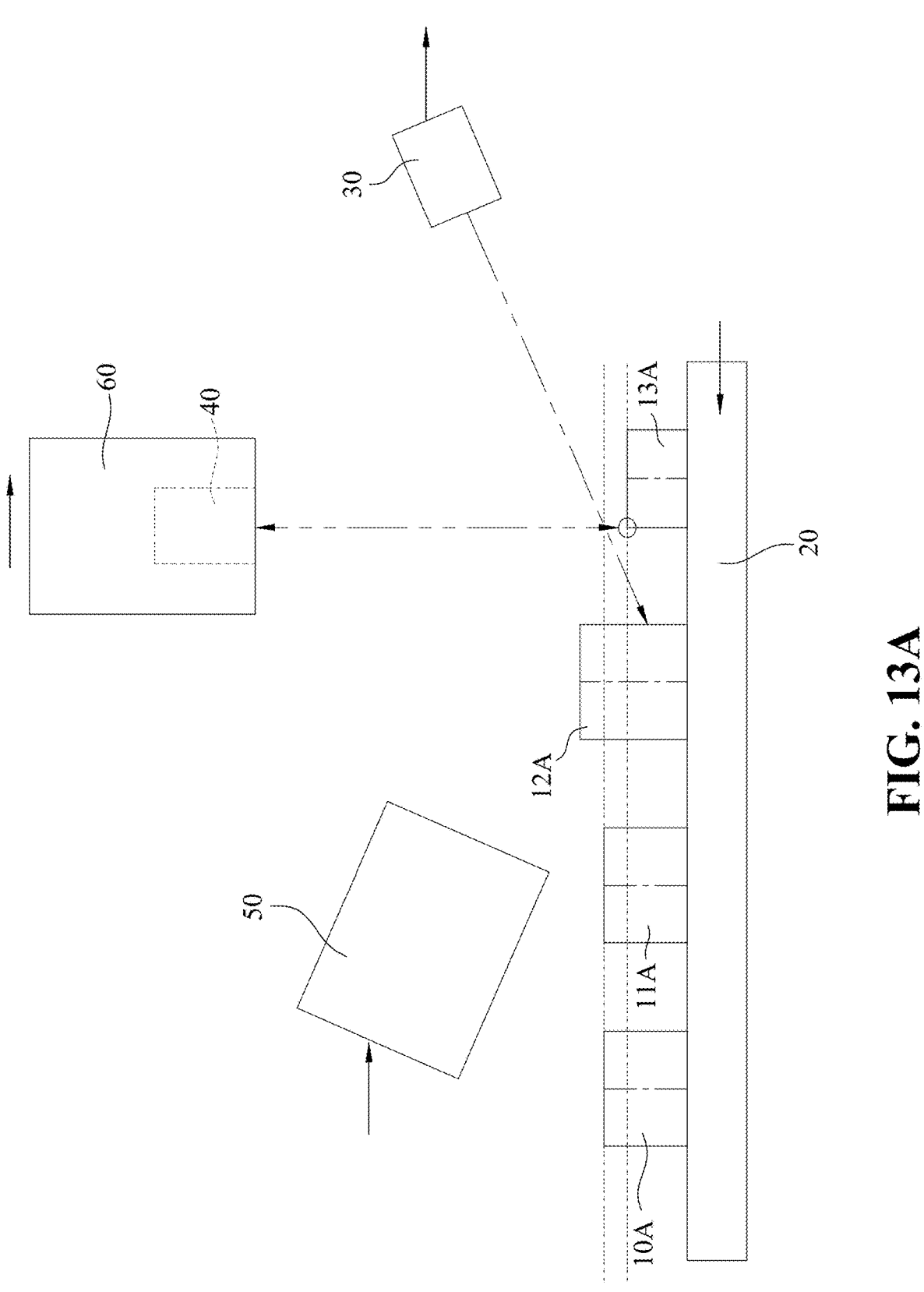
FIGS. 13A to 13F are schematic views of steps S30, S40, S50 and S63 of the third embodiment of the method of the present invention.
Figure 13B:
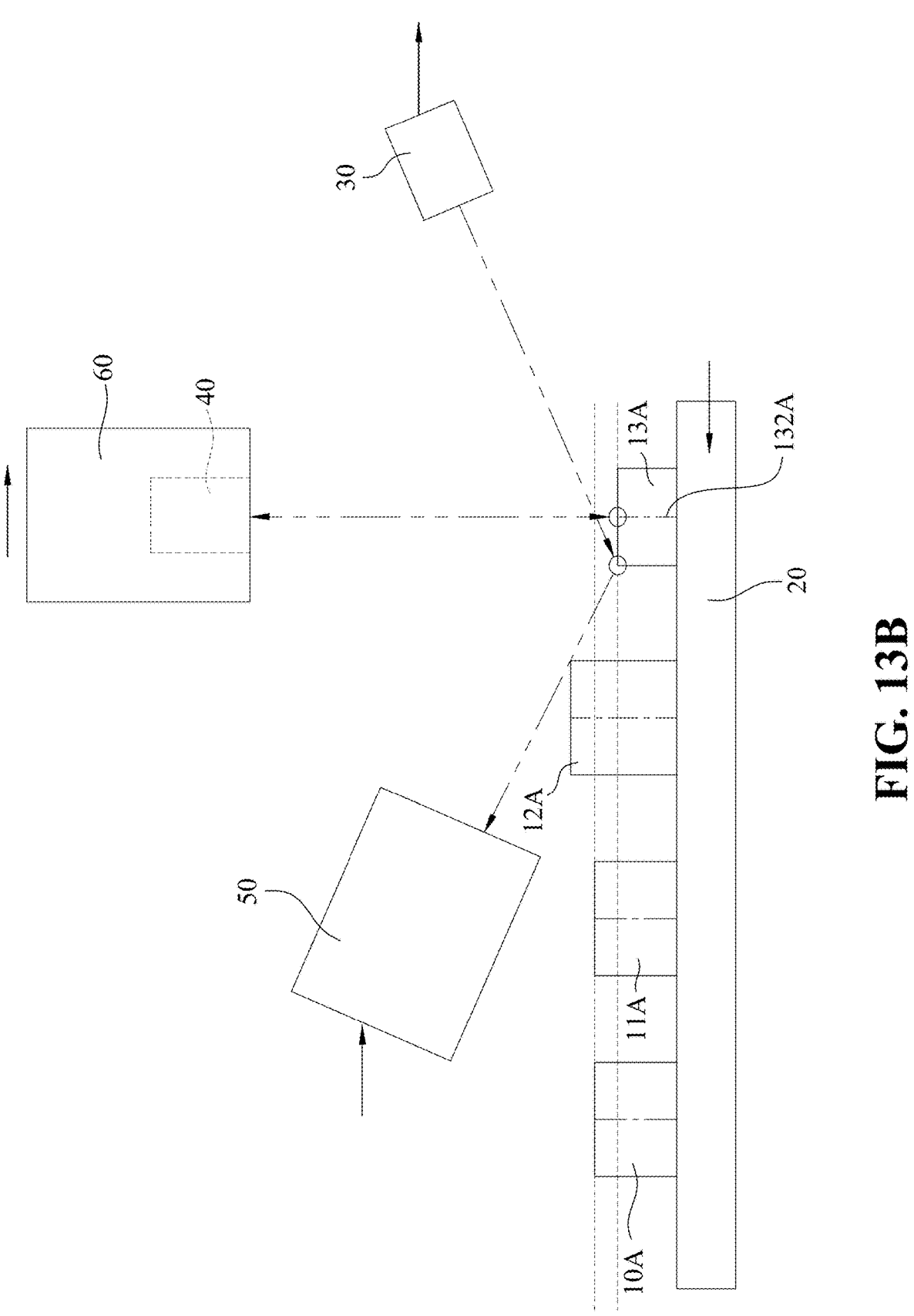
Figure 13C:
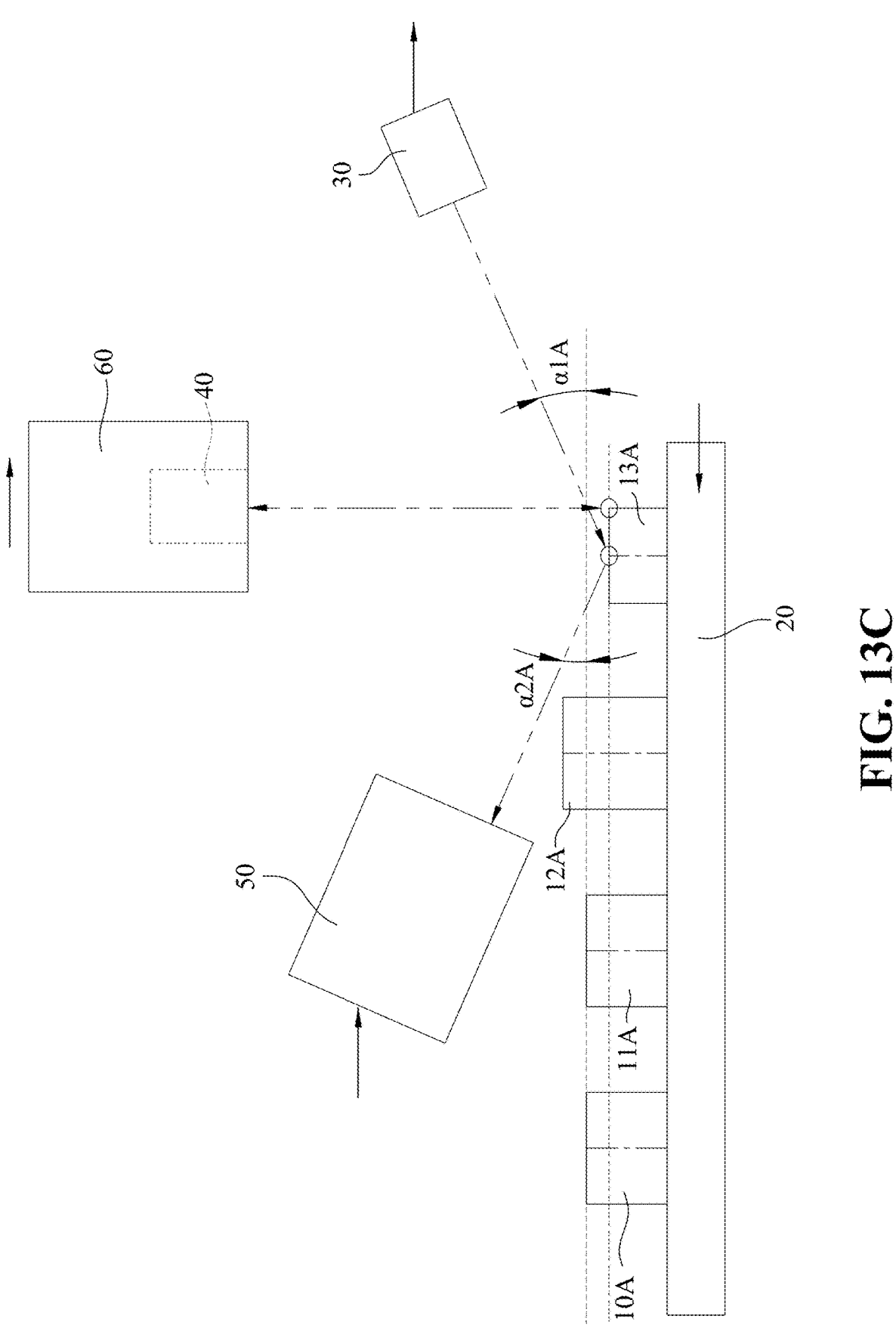
Figure 13D:
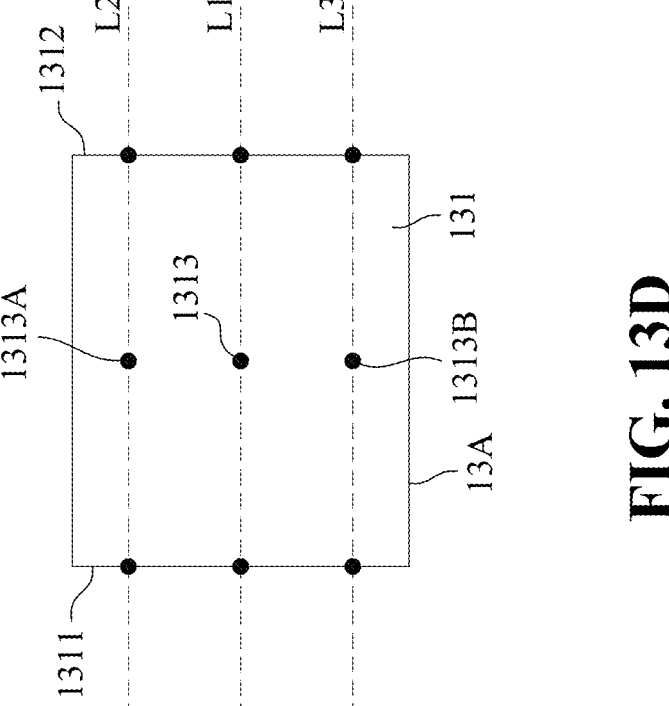
Figure 13E:
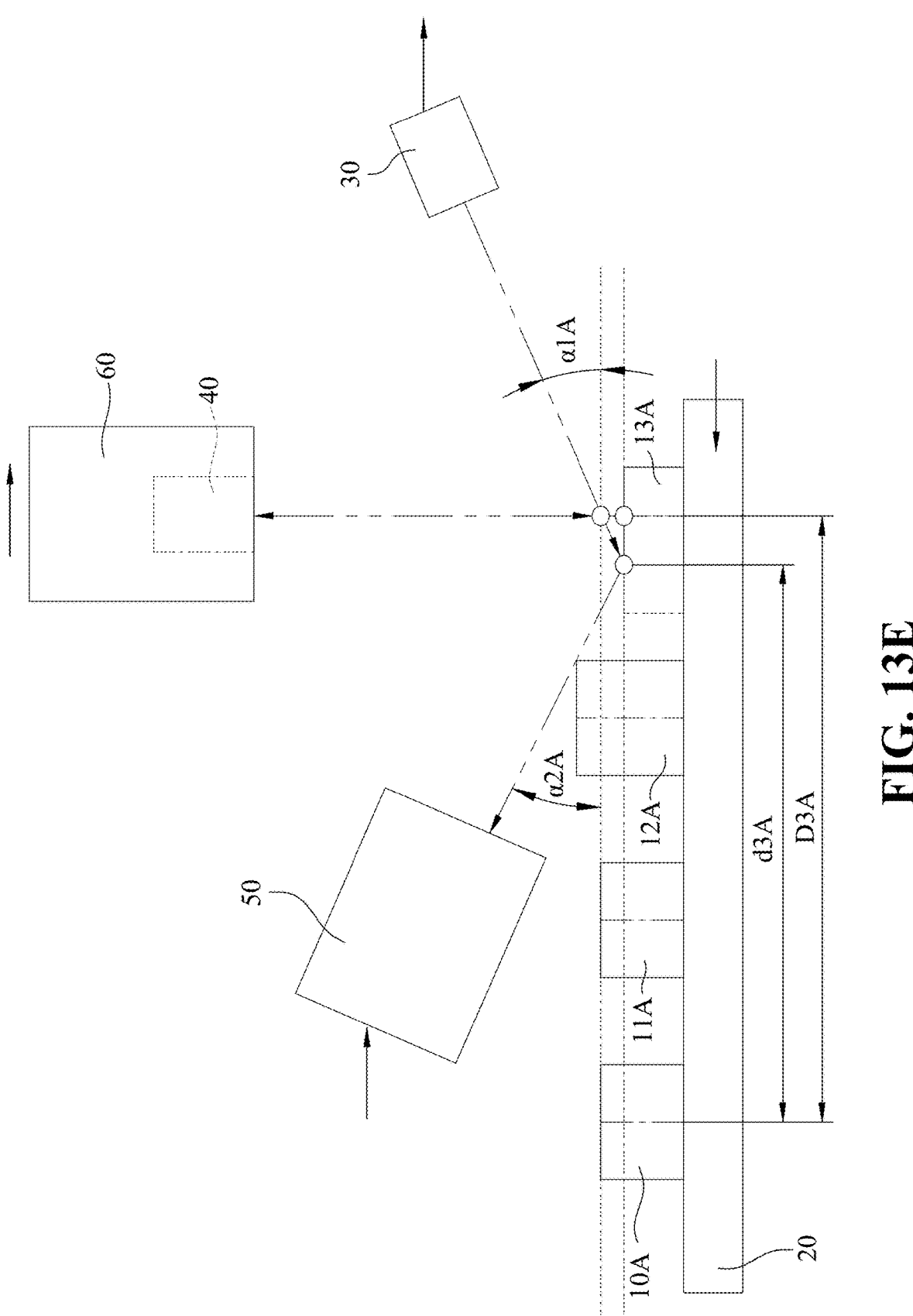
Figure 13F:
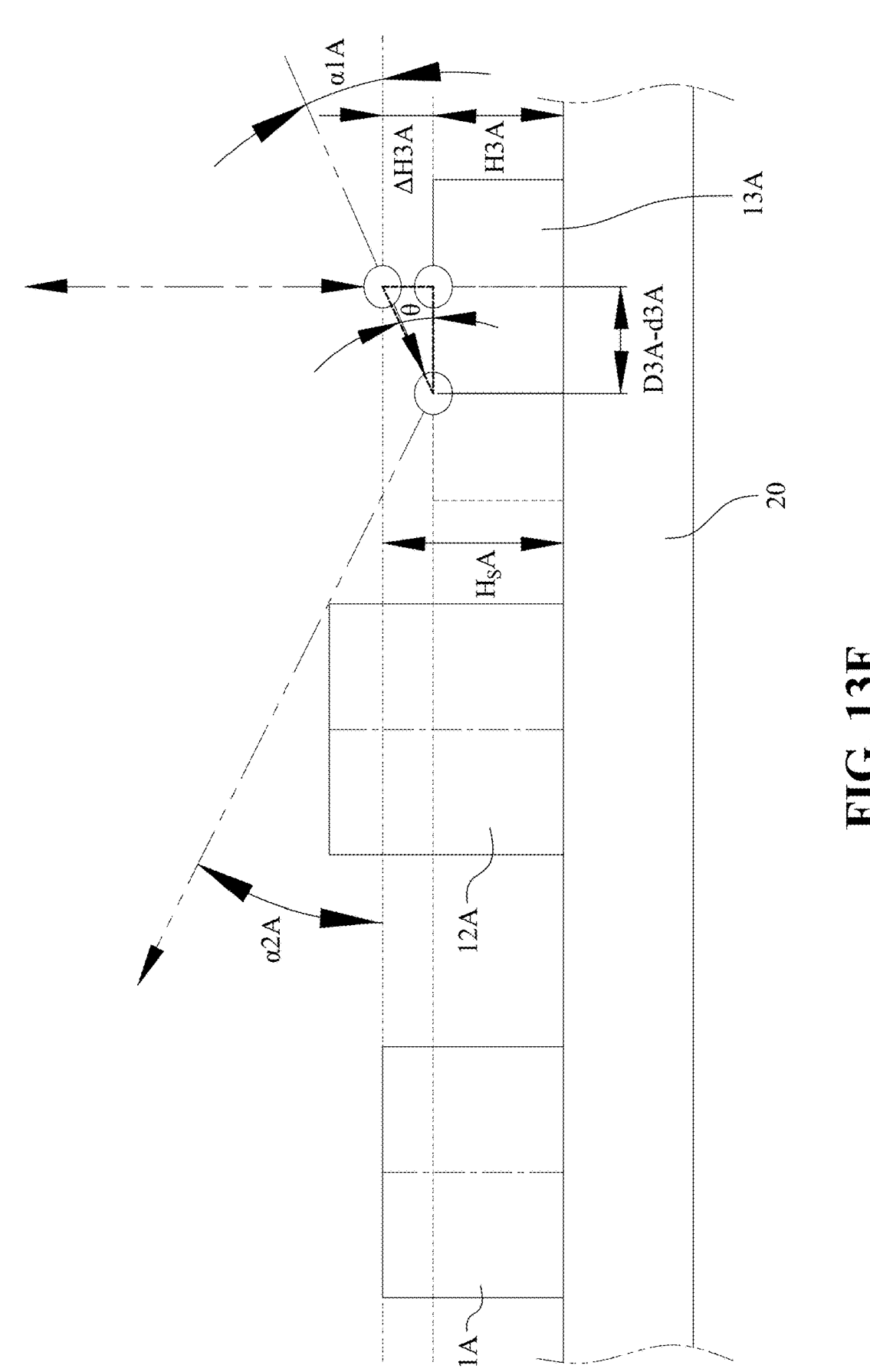

Step S40, as shown in FIGS. 4, 8A, 11A, 11B, 12A-12E, 13A-13E, the light from the first light source 30 is reflected by the top surface 111 of the target object 11A, 12A, 13A, 121, 131, the first image capture unit 50 uses the reflected light of the first light source 30 to capture images of a first end 1111, 1211, 1231 and a second end 1112, 1212, 1312 of the top surface 111, 121, 131 of the target object 11, 12, 13, the processing unit 80 calculates the midpoint positions 1113, 1113A, 1113B, 1213, 1213A, 1213B, 1313, 1313A, 1313B based on the images of the first end 1111, 1211, 1311 and the second end 1112, 1212 and 1312, and the sensing unit 70 senses a first movement distance of the work platform 20 or a first movement distance of the first light source 30 and the first image capture unit 50. The first movement distances are denoted as d1A, d2A, and d3A. More specifically, as shown in FIG. 11B, the light from the first light source 30 and the light from the second light source 40 may illuminate the top surface 111 of the target object 11A along a center line L1. At this time, the midpoint position 1113 happens to be at the axis position of the target object 11A; the light from the first light source 30 and the light from the second light source 40 may also illuminate the top surface 111 of the target object 11A along an eccentric line L2, L3. At this time, the midpoint positions 1113A and 1113B are at the eccentric position of the target object 11A. More specifically, as shown in FIG. 12D, the light from the first light source 30 and the light from the second light source 40 may illuminate the top surface 121 of the target object 12A along a center line L1. At this time, the midpoint position 1213 happens to be at the axis position of the target object 12A; the light from the first light source 30 and the light from the second light source 40 may also illuminate the top surface 121 of the target object 12A along an eccentric line L2, L3. At this time, the midpoint positions 1213A and 1213B are at the eccentric position of the target object 12A. More specifically, as shown in FIG. 13D, the light from the first light source 30 and the light from the second light source 40 may illuminate the top surface 131 of the target object 13A along a center line L1. At this time, the midpoint position 1313 is exactly at the axis position of the target object 13A; the light from the first light source 30 and the light from the second light source 40 may also illuminate the top surface 131 of the target object 13A along an eccentric line L2, L3. At this time, the midpoint positions 1313A and 1313B are at the eccentric position of the target object 13A.

Step S50, as shown in FIGS. 4, 8A, 11A, 11B, 12A-12E, 13A-13E, the light from the second light source 40 is reflected by the top surface 111, 121, 131 of the target object 11A, 12A, 13A, the second image capture unit 60 captures the images of the first ends 1111, 1211, 1311 and the second ends 1112, 1212, 1312 of the top surfaces 111, 121, 131 of the target objects 11, 12, 13 through the reflected light of the second light source 40. The processing unit 80 calculates midpoint positions 1113, 1113A, 1113B, 1213, 1213A, 1213B, 1313, 1313A, 1313B based on the images of the first ends 1111, 1211, 1311 and the second ends 1112, 1212, 1312 of the top surfaces 111, 121, 131 of the target objects 11, 12, 13, and the sensing unit 70 senses a second movement distance of the work platform 20 or a second movement distance of the second light source 40 and the second image capture unit 60, and the second movement distances are denoted as D1A, D2A, D3A, respectively.

Step S61, as shown in FIGS. 4, 8B, 11A, and 11B, when the first movement distance d1A is equal to the second movement distance D1A, the processing unit 80 determines that the height H1A of the target object 11A is equal to the height H$_s$A of the reference object 10A and determines that the target object 11A is non-defective.

Step S62, as shown in FIGS. 4, 8C, and 12A-12F, when the first movement distance d2A is greater than the second movement distance D2A, the processing unit 80 determines that the height H2A of the target object 12A is greater than the height H$_s$A of the reference object 10A and determines that the target object 12A is defective, and the height H2A of the target object 12A is calculated according to the following formula: $\Delta H2A=(d2A-D2A)\times\tan(\theta)$, H2A=H_s A+$\Delta$H2A, where $\theta$ equals the first angle $\alpha$1A.

Step S63, as shown in FIGS. 4, 8D, and 13A-13F, when the first movement distance d3A is less than the second movement distance D3A, the processing unit 80 determines that the height H3A of the target object 13A is less than the height H$_s$A of the reference object 10A and determines that the target object 13A is defective, and the height H3A of the target object 13A is calculated according to the following formula: $\Delta H3A=(D3A-d3A)\times\tan(\theta)$, H3A=H_s A-$\Delta$H3A, where $\theta$ equals the first angle $\alpha$1A.

In the third embodiment, in step S20, as shown in FIG. 9A, the light of the second light source 40 and the reflected light of the second light source 40 overlap with an axis 102A of the reference object 10A. In step S50, as shown in FIGS. 11A, 12C, and 13B, the light of the second light source 40 and the reflected light of the second light source 40 overlap with an axis 112A, 122A, 132A of the target object 11A, 12A, 13A.

Figure 14:
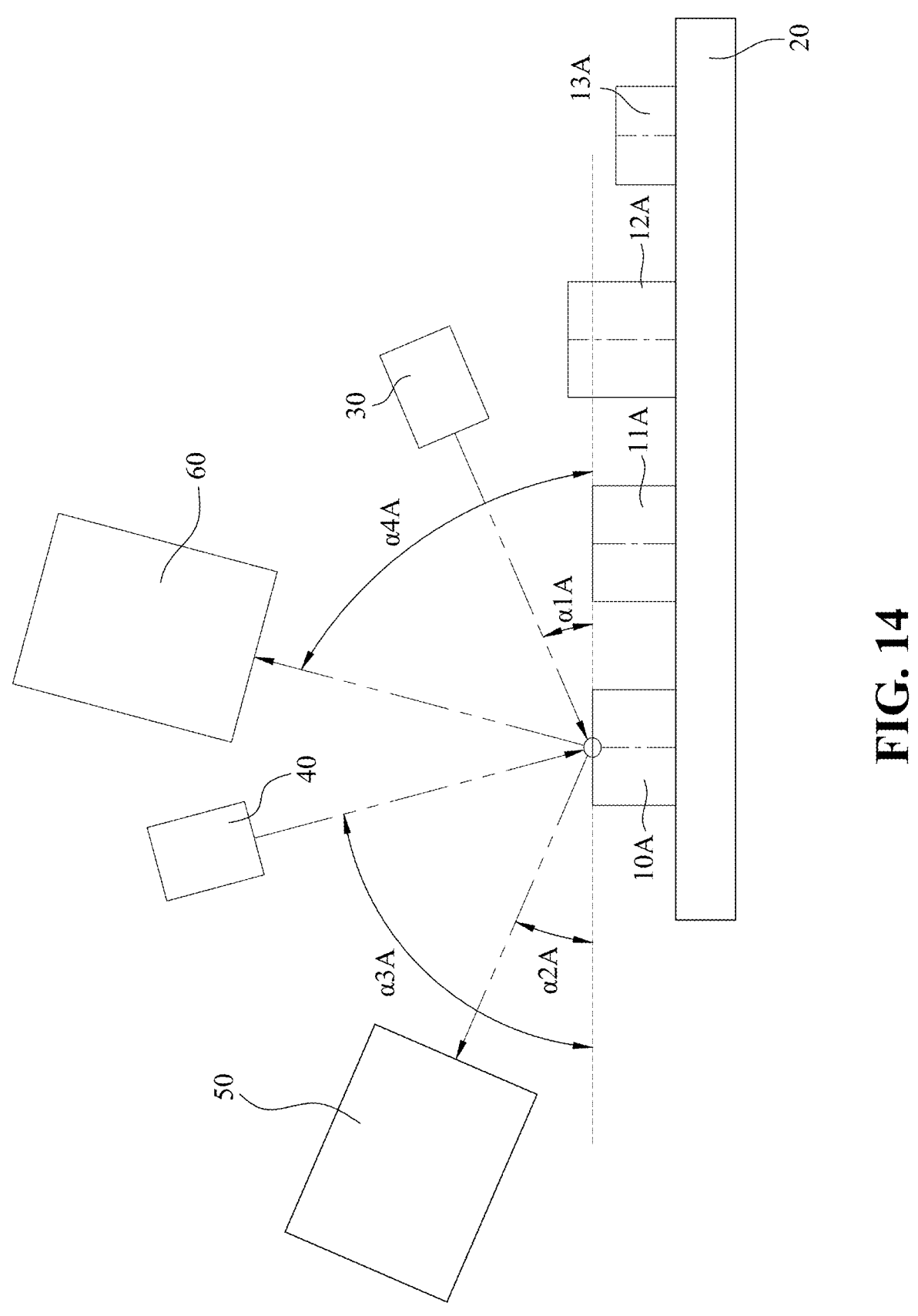
FIG. 14 is a schematic view of step S10 and step S20 of a fourth embodiment of the method of the present invention.

FIG. 14 is a schematic view of step S10 and step S20 of the fourth embodiment of the method of the present invention. The difference between the fourth embodiment and the third embodiment is that in step S20, as shown in FIG. 14, there is a third angle $\alpha$3A between the light of the second light source 40 and the top surface of the reference object 10A, there is a fourth angle $\alpha$4A between the reflected light of the second light source 40 and the top surface of the reference object 10A, and the third angle $\alpha$3A is equal to the fourth angle $\alpha$4A. Specifically, because the incident angle is the angle between the incident light ray and the normal line of the top surface of the reference object 10A, the incident angle is equal to 90 degrees minus the third angle $\alpha$3A; because the reflection angle is the angle between the reflected light ray and the top surface of the reference object 10A, the reflection angle is equal to 90 degrees minus the fourth angle $\alpha$4A. Other than this, the remaining technical features of the fourth embodiment are identical to those of the third embodiment.

In summary, the method of the present invention can accurately measure the height of the target objects 11, 11A, 12, 12A, 13, 13A, and can accurately determine whether the target objects 11, 11A, 12, 12A, 13, and 13A are defective based on the difference between the height of the reference objects 10, 10A and the heights H1, H1A, H2, H2A, H3, and H3A of the target objects 11, 11A 12, 12A, 13, and 13A.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A semiconductor micro bump height measurement method, comprising the following steps of:

placing a reference object and a target object on a work platform, wherein both the reference object and the target object are of a spherical shape, the height of the reference object is H$_s$, the height of the target object is H, both the reference object and the target object are semiconductor micro bumps;

a light of a first light source and a light of a second light source being simultaneously reflected by the top of the reference object, a first image capture unit capturing an image of the top of the reference object through the reflected light of the first light source, and a second image capture unit capturing an image of the top of the reference object through the reflected light of the second light source; a first angle being formed between the light of the first light source and a horizontal plane passing through the top of the reference object, a second angle being formed between the reflected light of the first light source and the horizontal planes passing through the top of the reference object, and the first angle being equal to the second angle;

moving the work platform or moving the first light source, the second light source, the first image capture unit, and the second image capture unit;

the light of the first light source being reflected by the top of the target object, the first image capture unit capturing an image of the top of the target object by the reflected light of the first light source, and a sensing unit sensing a first movement distance of the work platform or a first movement distance of the first light source and the first image capture unit, and defining the first movement distance as d;

the light of the second light source being reflected by the top of the target object, the second image capture unit capturing an image of the top of the target object by the reflected light of the second light source, and a sensing unit sensing a second movement distance of the work platform or a second movement distance of the second light source and the second image capture unit, and defining the second movement distance as D; and when the first movement distance being equal to the second movement distance, a processing unit determining that a height of the target object being equal to the height of the reference object and the target object as non-defective; when the first movement distance being greater than the second movement distance, the processing unit determining that the height of the target object being greater than the height of the reference object and determining the target object as defective, and calculating the height of the target object as: $\Delta H=(d-D)\times\tan(\theta)$, $H=H_s+\Delta H$, where $\theta$ is equal to the first angle; when the first movement distance being smaller than the second movement distance, the processing unit determining that the height of the target object being less than the height of the reference object and determining the target object as defective, and calculating the height of the target object as: $\Delta H=(D-d)\times\tan(\theta)$, $H=H_s-\Delta H$, where $\theta$ is equal to the first angle.

2. The semiconductor micro bump height measurement method according to claim 1, wherein the step of a light of a first light source and a light of a second light source being simultaneously reflected by the top of the reference object further comprises: the light of the second light source and the reflected light of the second light source overlap with an axis of the reference object; wherein the step of the light of the second light source being reflected by the top of the target object further comprises: the light of the second light source and the reflected light of the second light source overlap with an axis of the target object.

3. The semiconductor micro bump height measurement method according to claim 1, wherein the step of a light of a first light source and a light of a second light source being simultaneously reflected by the top of the reference object further comprises: a third angle being formed between the light of the second light source and the horizontal plane passing through the top of the reference object, a fourth angle being formed between the reflected light of the second light source and the horizontal plane passing through the top of the reference object, and the third angle is equal to the fourth angle.

4. The semiconductor micro bump height measurement method according to claim 1, wherein the step of moving the work platform or moving the first light source, the second light source, the first image capture unit, and the second image capture unit further comprises: the first light source, the second light source, the first image capture unit, and the second image capturing unit move at a constant speed or the work platform moves at a constant speed.

5. The semiconductor micro bump height measurement method according to claim 1, wherein the semiconductor micro bumps are solder pads, copper pillars, metal eutectics or metal contacts.

6. A semiconductor micro bump height measurement method, comprising the following steps of:

placing a reference object and a target object on a work platform, wherein both the reference object and the target object are of a rectangular cuboid shape, the height of the reference object is $H_s$, the height of the target object is H, both the reference object and the target object are semiconductor micro bumps;

a light of the first light source and a light of the second light source being simultaneously reflected by the top surface of the reference object, and a first image capture unit capturing images of a first end and a second end of the top surface of the reference object through the reflected light of the first light source, and the second image capture unit capturing images of the first end and the second end of the top surface of the reference object through the reflected light of the second light source, and a processing unit calculating a midpoint position of the first end and the second end of the top surface of the reference object based on the images of the first end and the second end of the top surface of the reference object; a first angle being formed between the light of the first light source and the top surface of the reference object, a second angle being formed between the reflected light of the first light source and the top surface of the reference object, and the first angle being equal to the second angle;

moving the work platform or moving the first light source, the second light source, the first image capture unit, and the second image capture unit;

the light from the first light source being reflected by the top surface of the target object, the first image capture unit capturing images of a first end and a second end of the top surface of the target object through the reflected light of the first light source, the processing unit calculating the midpoint positions based on the images of the first end and the second end, and the sensing unit sensing a first movement distance of the work platform or a first movement distance of the first light source and the first image capture unit, the first movement distances being denoted by d;

the light from the second light source being reflected by the top surface of the target object, the second image capture unit capturing the images of the first end and the second end of the top surface of the target object through the reflected light of the second light source; the processing unit calculating midpoint positions based on the images of the first end and the second end of the top surface of the target object, and the sensing unit sensing a second movement distance of the work platform or a second movement distance of the second light source and the second image capture unit, and the second movement distances being denoted by D; and when the first movement distance being equal to the second movement distance, a processing unit determining that a height of the target object being equal to the height of the reference object and the target object as non-defective; when the first movement distance being greater than the second movement distance, the processing unit determining that the height of the target object being greater than the height of the reference object and determining the target object as defective, and calculating the height of the target object as: $\Delta H=(d-D)\times\tan(\theta)$, $H=H_s+\Delta H$, where $\theta$ is equal to the first angle; when the first movement distance being smaller than the second movement distance, the processing unit determining that the height of the target object being less than the height of the reference object and determining the target object as defective, and calculating the height of the target object as: $\Delta H=(D-d)\times\tan(\theta)$, $H=H_s-\Delta H$, where $\theta$ is equal to the first angle.

7. The semiconductor micro bump height measurement method according to claim 6, wherein the step of a light of a first light source and a light of a second light source being simultaneously reflected by the top surface of the reference object further comprises: the light of the second light source and the reflected light of the second light source overlap with an axis of the reference object; wherein the step of the light of the second light source being reflected by the top surface of the target object further comprises: the light of the second light source and the reflected light of the second light source overlap with an axis of the target object.

8. The semiconductor micro bump height measurement method according to claim 6, wherein the step of a light of a first light source and a light of a second light source being simultaneously reflected by the top surface of the reference object further comprises: a third angle being formed between the light of the second light source and the top surface of the reference object, a fourth angle being formed between the reflected light of the second light source and the top surface of the reference object, and the third angle is equal to the fourth angle.

9. The semiconductor micro bump height measurement method according to claim 6, wherein the step of moving the work platform or moving the first light source, the second light source, the first image capture unit, and the second image capture unit further comprises: the first light source, the second light source, the first image capture unit, and the second image capturing unit move at a constant speed or the work platform moves at a constant speed.

10. The semiconductor micro bump height measurement method according to claim 6, wherein the semiconductor micro bumps are solder pads, copper pillars, metal eutectics or metal contacts.

\* \* \* \* \*